United States Patent
Miyazawa

(10) Patent No.: US 10,627,765 B2
(45) Date of Patent: Apr. 21, 2020

(54) INFORMATION PROCESSING DEVICE ORDERING CARTRIDGES FOR REPLACEMENT WITH CARTRIDGES CURRENTLY MOUNTED IN PRINTING DEVICE

(71) Applicant: BROTHER KOGYO KABUSHIKI KAISHA, Nagoya-shi, Aichi-ken (JP)

(72) Inventor: Masafumi Miyazawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 16/381,586

(22) Filed: Apr. 11, 2019

(65) Prior Publication Data
US 2019/0346801 A1 Nov. 14, 2019

(30) Foreign Application Priority Data
May 10, 2018 (JP) ................................ 2018-091416

(51) Int. Cl.
*G03G 15/00* (2006.01)
*B41J 2/00* (2006.01)
(Continued)

(52) U.S. Cl.
CPC ........ *G03G 15/556* (2013.01); *B41J 2/17566* (2013.01); *G03G 15/5079* (2013.01);
(Continued)

(58) Field of Classification Search
CPC ............... G03G 15/553; G03G 15/556; G03G 15/5079; B41J 2/17566; G06F 3/1219;
(Continued)

(56) References Cited

U.S. PATENT DOCUMENTS

2016/0062293 A1   3/2016 Nakamura et al.
2017/0061268 A1*  3/2017 Miyazawa ......... G06K 15/4075
(Continued)

FOREIGN PATENT DOCUMENTS

JP   2013174650 A  *  9/2013
JP   2015090384 A  *  5/2015
(Continued)

*Primary Examiner* — Robert B Beatty
(74) *Attorney, Agent, or Firm* — Merchant & Gould P.C.

(57) ABSTRACT

In an information processing device, a controller acquires a plurality of sets of first and second information corresponding to respective ones of a plurality of first cartridges and a plurality of second cartridges replaced with respective ones of the plurality of first cartridges. The controller sets an order level for a target first cartridge using target second information of a target second cartridge, and sets at least one replacement target cartridge including the target first cartridge using the plurality of sets of first information. The at least one replacement target cartridge includes M-number first cartridges if the order level is a first level selected when the target second information represents a final residual quantity of printing agent greater than a reference. The at least one replacement target cartridge includes N-number first cartridges if the order level is a second level. N is greater than or equal to M.

20 Claims, 14 Drawing Sheets

(51) Int. Cl.
  *G06F 3/00* (2006.01)
  *G06K 15/00* (2006.01)
  *G06Q 10/00* (2012.01)
  *G06F 3/12* (2006.01)
  *B41J 2/175* (2006.01)
  *G06Q 10/08* (2012.01)
(52) U.S. Cl.
  CPC .......... *G06F 3/1219* (2013.01); *G06F 3/1235* (2013.01); *G06K 15/4075* (2013.01); *G06Q 10/087* (2013.01)
(58) Field of Classification Search
  CPC .... G06F 3/1229; G06F 3/1235; G06F 3/1296; G06K 15/4075; G06Q 10/087; G06Q 10/20
  USPC .......................................... 399/27, 43; 347/7
  See application file for complete search history.

(56) References Cited

U.S. PATENT DOCUMENTS

2018/0024786 A1* 1/2018 Miyazawa ......... H04N 1/00015
  358/2.1
2019/0193414 A1* 6/2019 Miyazawa ............ B41J 2/17566
2019/0346800 A1* 11/2019 Nogawa ................ G06F 3/1219

FOREIGN PATENT DOCUMENTS

| JP | 2016-48501 | A | | 4/2016 | |
|----|------------|---|---|--------|---|
| JP | 2016194906 | A | * | 11/2016 | |
| JP | 2017037596 | A | * | 2/2017 | |
| JP | 2017047537 | A | * | 3/2017 | ........... G06K 15/402 |

* cited by examiner

| SERIAL NUMBER | MODEL NAME | DELIVERY DESTINATION ID | COLOR OF INK | ORDER FLAG | PREVIOUS FINAL RESIDUAL PERCENTAGE | INK HISTORY INFORMATION ||||| |
|---|---|---|---|---|---|---|---|---|---|---|---|
| | | | | | | ACQUISITION DATE/TIME | RESIDUAL PERCENTAGE | ACQUISITION DATE/TIME | RESIDUAL PERCENTAGE | ACQUISITION DATE/TIME | RESIDUAL PERCENTAGE |
| EN1 AAABBB | MDL_200 | ID_A | C | OFF | 0% | 2017/12/01 10:10:10 | 100% | 2017/12/02 01:00:00 | 95% | 2017/12/03 01:00:00 | 90% |
| | | | M | ON | 0% | 2017/12/01 10:10:10 | 100% | 2017/12/02 01:00:00 | 97% | 2017/12/03 01:00:00 | 93% |
| | | | Y | ON | 0% | 2017/12/01 10:10:10 | 100% | 2017/12/02 01:00:00 | 95% | 2017/12/03 01:00:00 | 90% |
| | | | K | ON | 5% | 2017/12/01 10:10:10 | 100% | 2017/12/02 01:00:00 | 97% | 2017/12/03 01:00:00 | 93% |
| EN2 CCCDDD | MDL_250 | ID_A | C | OFF | 0% | 2017/12/01 11:11:11 | 100% | 2017/12/02 01:00:00 | 95% | 2017/12/03 01:00:00 | 90% |
| | | | M | ON | 0% | 2017/12/01 11:11:11 | 100% | 2017/12/02 01:00:00 | 97% | 2017/12/03 01:00:00 | 93% |
| | | | Y | ON | 0% | 2017/12/01 11:11:11 | 100% | 2017/12/02 01:00:00 | 95% | 2017/12/03 01:00:00 | 90% |
| | | | K | ON | 0% | 2017/12/01 11:11:11 | 100% | 2017/12/02 01:00:00 | 97% | 2017/12/03 01:00:00 | 93% |

...

FIRST STORAGE STATE S1

SECOND STORAGE STATE S2

INFORMATION PROCESSING DEVICE ORDERING CARTRIDGES FOR REPLACEMENT WITH CARTRIDGES CURRENTLY MOUNTED IN PRINTING DEVICE

CROSS REFERENCE TO RELATED APPLICATION

This application claims priority from Japanese Patent Application No. 2018-091416 filed May 10, 2018. The entire content of the priority application is incorporated herein by reference.

TECHNICAL FIELD

The present disclosure relates to a technique for ordering cartridges accommodating printing agent and to be mounted in a printing device.

BACKGROUND

A server that manages a plurality of printers is well known in the art. With conventional technology, each of the printers transmits data including the residual quantities of toner in their cartridges to the server. When the residual quantity of toner in a cartridge mounted in one of the printers drops to a threshold value or below, the server sets the cartridge as a supply target (a target for replacement). The server then estimates the timings at which replacement cartridges must be supplied for cartridges other than the cartridge set as the supply target. If the estimated timing for any cartridge other than the supply target is within three days of the current date, the server adds these cartridges as supply targets.

SUMMARY

However, since this technique supplies replacement cartridges for all cartridges set as supply targets despite some of the cartridges still containing residual quantities of toner, the cartridges may be replaced too early. Consequently, some toner may be wasted if the cartridge is replaced while still containing some toner.

In view of the foregoing, it is an object of the present disclosure to provide a technique for reducing costs associated with preparing replacement cartridges that accommodate printing agent (toner or ink, for example) while suppressing the wastage of the printing agent.

In order to attain the above and other objects, the present disclosure provides an information processing device that includes a controller. The controller is configured to perform: (a) acquiring; (b) acquiring; (c) selecting; (d) setting; (e) determining; (f) setting; and (g) executing. The (a) acquiring acquires a plurality of sets of first information from at least one printing device. The at least one printing device has a plurality of mounting portions and a plurality of printing portions in total. A plurality of first cartridges accommodating printing agent is currently mounted in respective ones of the plurality of mounting portions. The plurality of printing portions is configured to execute printing operations using printing agent supplied from respective ones of the plurality of first cartridges. The plurality of sets of first information correspond to respective ones of the plurality of first cartridges. Each of the plurality of sets of first information is representative of a residual quantity of printing agent remaining in a corresponding one of the plurality of first cartridges and a corresponding one of the printing portions. The (b) acquiring acquires a plurality of sets of second information from the at least one printing device. The plurality of sets of second information correspond to respective ones of a plurality of second cartridges. The plurality of second cartridges was previously mounted in respective ones of the plurality of mounting portions and has been replaced with respective ones of the plurality of first cartridges. Each of the plurality of sets of second information is representative of a final residual quantity of printing agent remaining in a corresponding one of the plurality of second cartridges and a corresponding one of the plurality of printing portions when the corresponding one of the plurality of second cartridges is replaced. The (c) selecting selects a target first cartridge from among the plurality of first cartridges. The plurality of sets of first information include target first information corresponding to the target first cartridge. The (d) setting sets an order level for the target first cartridge using target second information among the plurality of sets of second information. The target second information corresponds to a target second cartridge among the plurality of second cartridges. The target second cartridge has been replaced with the target first cartridge. The order level is selected from among a plurality of levels including a first level and a second level. The first level is selected in a case where the target second information represents a final residual quantity greater than a reference. The second level is selected in a case where the target second information represents a final residual quantity less than or equal to the reference. The (e) determining determines whether an order condition is met for the target first cartridge using the target first information. The (f) setting sets, in response to determining that the order condition is met, at least one replacement target cartridge from among the plurality of first cartridges using the plurality of sets of first information and the order level. The at least one replacement target cartridge includes the target first cartridge. The (g) executing executes an ordering process to order at least one replacement cartridge for replacement with respective ones of the at least one replacement target cartridge. The at least one replacement target cartridge includes M number of first cartridges in a case where the order level is the first level. M is an integer greater than or equal to one. The at least one replacement target cartridge includes N number of first cartridges in a case where the order level is the second level. N is an integer greater than or equal to M.

According to another aspect, the present disclosure provides a non-transitory computer readable storage medium storing a set of program instructions. The set of program instructions is installed on and executed by a computer. The set of program instructions includes: (a) acquiring; (b) acquiring; (c) selecting; (d) setting; (e) determining; (f) setting; and (g) executing. The (a) acquiring acquires a plurality of sets of first information from at least one printing device. The at least one printing device has a plurality of mounting portions and a plurality of printing portions in total. A plurality of first cartridges accommodating printing agent is currently mounted in respective ones of the plurality of mounting portions. The plurality of printing portions is configured to execute printing operations using printing agent supplied from respective ones of the plurality of first cartridges. The plurality of sets of first information corresponds to respective ones of the plurality of first cartridges. Each of the plurality of sets of first information is representative of a residual quantity of printing agent remaining in a corresponding one of the plurality of first cartridges and a corresponding one of the plurality of printing portions. The (b) acquiring acquires a plurality of sets of second information from the at least one printing device. The plurality of sets of second information correspond to respective ones of a plurality of second cartridges. The plurality of second cartridges was previously mounted in respective ones of the plurality of mounting portions and has been replaced with respective ones of the plurality of first cartridges. Each of the plurality of sets of second information is representative of a final residual quantity of printing agent remaining in a corresponding one of the plurality of second cartridges and a corresponding one of the plurality of printing portions when the corresponding one of the plurality of second cartridges is replaced. The (c) selecting selects a target first cartridge from among the plurality of first cartridges. The plurality of sets of first information include target first information corresponding to the target first cartridge. The (d) setting sets an order level for the target first cartridge using target second information among the plurality of sets of second information. The target second information corresponds to a target second cartridge among the plurality of second cartridges. The target second cartridge has been replaced with the target first cartridge. The order level is selected from among a plurality of levels including a first level and a second level. The first level is selected in a case where the target second information represents a final residual quantity greater than a reference. The second level is selected in a case where the target second information represents a final residual quantity less than or equal to the reference. The (e) determining determines whether an order condition is met for the target first cartridge using the target first information. The (f) setting sets, in response to determining that the order condition is met, at least one replacement target cartridge from among the plurality of first cartridges using the plurality of sets of first information and the order level. The at least one replacement target cartridge includes the target first cartridge. The (g) executing executes an ordering process to order at least one replacement cartridge for replacement with respective ones of the at least one replacement target cartridge. The at least one replacement target cartridge includes M number of first cartridges in a case where the order level is the first level. M is an integer greater than or equal to one. The at least one replacement target cartridge includes N number of first cartridges in a case where the order level is the second level. N is an integer greater than or equal to M.

According to still another aspect, the present disclosure provides a method executed by a computer. The method includes: (a) acquiring; (b) acquiring; (c) selecting; (d) setting; (e) determining; (f) setting; and (g) executing. The (a) acquiring acquires a plurality of sets of first information from at least one printing device. The at least one printing device has a plurality of mounting portions and a plurality of printing portions in total. A plurality of first cartridges accommodating printing agent is currently mounted in respective ones of the plurality of mounting portions. The plurality of printing portions is configured to execute printing operations using printing agent supplied from respective ones of the plurality of first cartridges. The plurality of sets of first information correspond to respective ones of the plurality of first cartridges. Each of the plurality of sets of first information is representative of a residual quantity of printing agent remaining in a corresponding one of the plurality of first cartridges and a corresponding one of the printing portions. The (b) acquiring acquires a plurality of sets of second information from the at least one printing device. The plurality of sets of second information correspond to respective ones of a plurality of second cartridges. The plurality of second cartridges was previously mounted in respective ones of the plurality of mounting portions and has been replaced with respective ones of the plurality of first cartridges. Each of the plurality of sets of second information is representative of a final residual quantity of printing agent remaining in a corresponding one of the plurality of second cartridges and a corresponding one of the plurality of printing portions when the corresponding one of the plurality of second cartridges is replaced. The (c) selecting selects a target first cartridge from among the plurality of first cartridges. The plurality of sets of first information include target first information corresponding to the target first cartridge. The (d) setting sets an order level for the target first cartridge using target second information among the plurality of sets of second information. The target second information corresponds to a target second cartridge among the plurality of second cartridges. The target second cartridge has been replaced with the target first cartridge. The order level is selected from among a plurality of levels including a first level and a second level. The first level is selected in a case where the target second information represents a final residual quantity greater than a reference. The second level is selected in a case where the target second information represents a final residual quantity less than or equal to the reference. The (e) determining determines whether an order condition is met for the target first cartridge using the target first information. The (f) setting sets, in response to determining that the order condition is met, at least one replacement target cartridge from among the plurality of first cartridges using the plurality of sets of first information and the order level. The at least one replacement target cartridge includes the target first cartridge. The (g) executing executes an ordering process to order at least one replacement cartridge for replacement with respective ones of the at least one replacement target cartridge. The at least one replacement target cartridge includes M number of first cartridges in a case where the order level is the first level. M is an integer greater than or equal to one. The at least one replacement target cartridge includes N number of first cartridges in a case where the order level is the second level. N is an integer greater than or equal to M.

BRIEF DESCRIPTION OF THE DRAWINGS

The particular features and advantages of the disclosure as well as other objects will become apparent from the following description taken in connection with the accompanying drawings, in which:

FIG. 3 is a table illustrating an example of a management database of the management server according to the first embodiment;

DETAILED DESCRIPTION

A. First Embodiment

A-1. Structure of a System 1000

Figure 1:
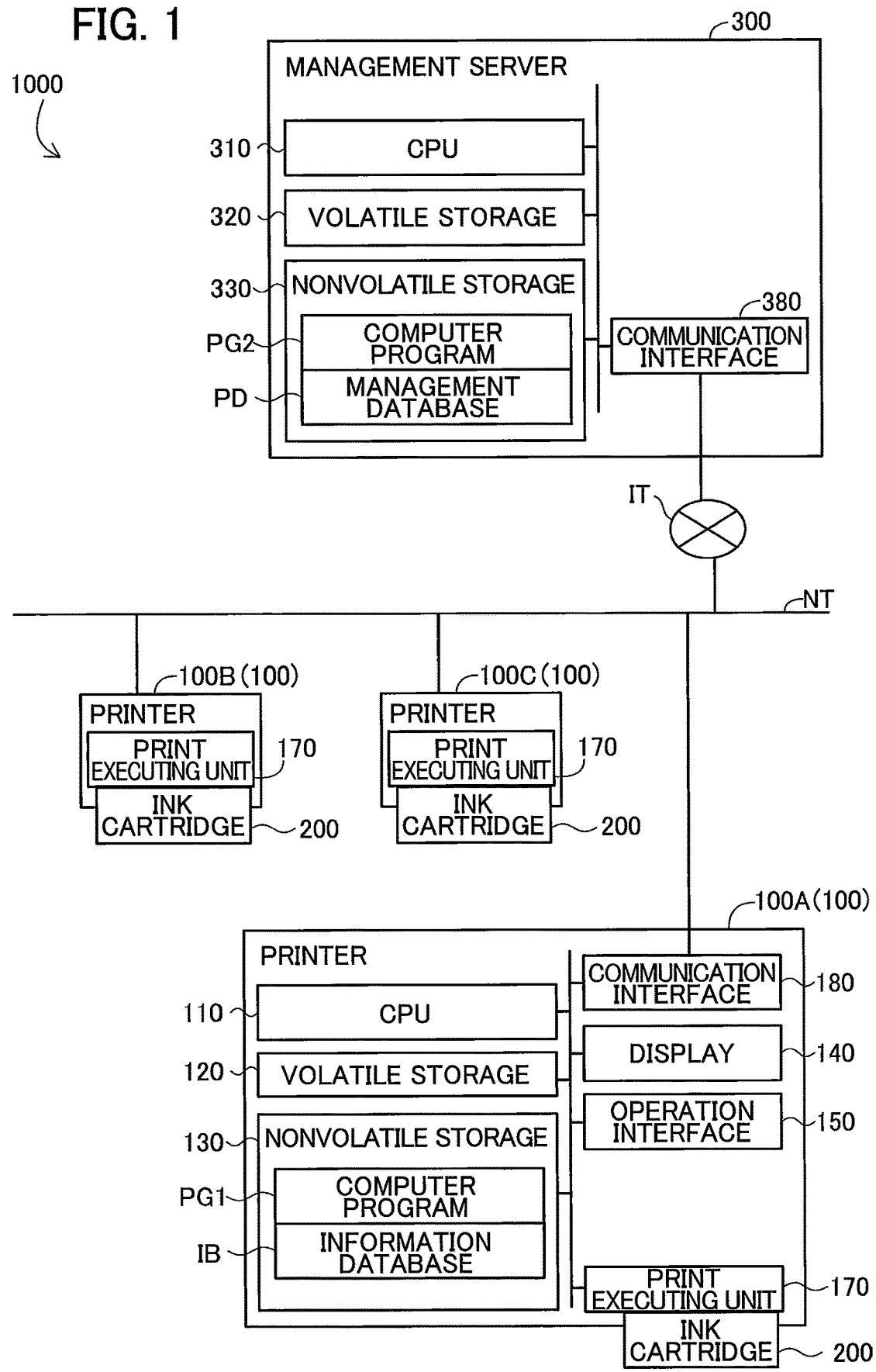
FIG. 1 is a block diagram illustrating a structure of a system including a plurality of printers and a management server according to a first embodiment of the present disclosure.

FIG. 1 is a block diagram illustrating the structure of a system 1000. The system 1000 is provided with a plurality of printers 100 under management, and a management server 300 as an example of the information processing device of the present disclosure. The plurality of printers 100 including printers 100A, 100B, and 100C are connected to a local area network NT and can communicate with each other over the local area network NT. The management server 300 belongs to the company that operates the system 1000, for example. The management server 300 is connected to an internet IT. The management server 300 is connected to and capable of communicating with the plurality of printers 100 under management via the internet IT and the local area network NT. Among the plurality of printers 100 under management, two or more printers 100 are disposed at the same location (within the same building, for example) and are used by the same user (employees of the same company, for example). Two or more ink cartridges 200 (described later) mounted in the two or more printers 100 provided at the same location are ink cartridges 200 with the same delivery destination.

A printer 100 (printer 100A in FIG. 1, for example) includes a central processing unit (CPU) 110 constituting a controller of the printer 100; a volatile storage 120, such as a dynamic random access memory (DRAM); a nonvolatile storage 30, such as a hard disk drive or a flash memory; a display 140, such as a liquid crystal display that displays images; an operation interface 150, such as a touchscreen and buttons designed to acquire operations performed by the user; a print executing unit 170; and a communication interface 180.

The communication interface 180 is configured to be in connection with the local area network NT. Specifically, the communication interface 180 is a wired interface conforming to Ethernet (registered trademark), or a wireless interface conforming to the Wi-Fi technology (based on the IEEE (Institute of Electrical and Electronics Engineers, Inc.) 802.11 standard or a standard based on this standard, such as one of the versions 802.11a, 11b, 11g, and 11n).

The CPU 110 is a processor that performs data processing. The volatile storage 120 provides a buffer region that temporarily stores various intermediate data generated when the CPU 110 performs processes. The nonvolatile storage 130 stores a computer program PG1 for controlling the printer 100, and an information database IB described later.

In the present embodiment, the computer program PG1 may be pre-stored in the nonvolatile storage 130 when the printer 100 is manufactured. Alternatively, the computer program PG1 may be made available through download from a server connected to the printer 100A over the internet IT, or may be provided in a recorded format, such as on a compact disc read only memory (CD-ROM).

By executing the computer program PG1, the CPU 110 executes a printing process for controlling the print executing unit 170 to print images. Also, by executing the computer program PG1, the CPU 110 transmits to the management server 300 various printer information, which is related to the printer 100 and is stored in the information database IB, in response to a request from the management server 300.

Figure 2A:
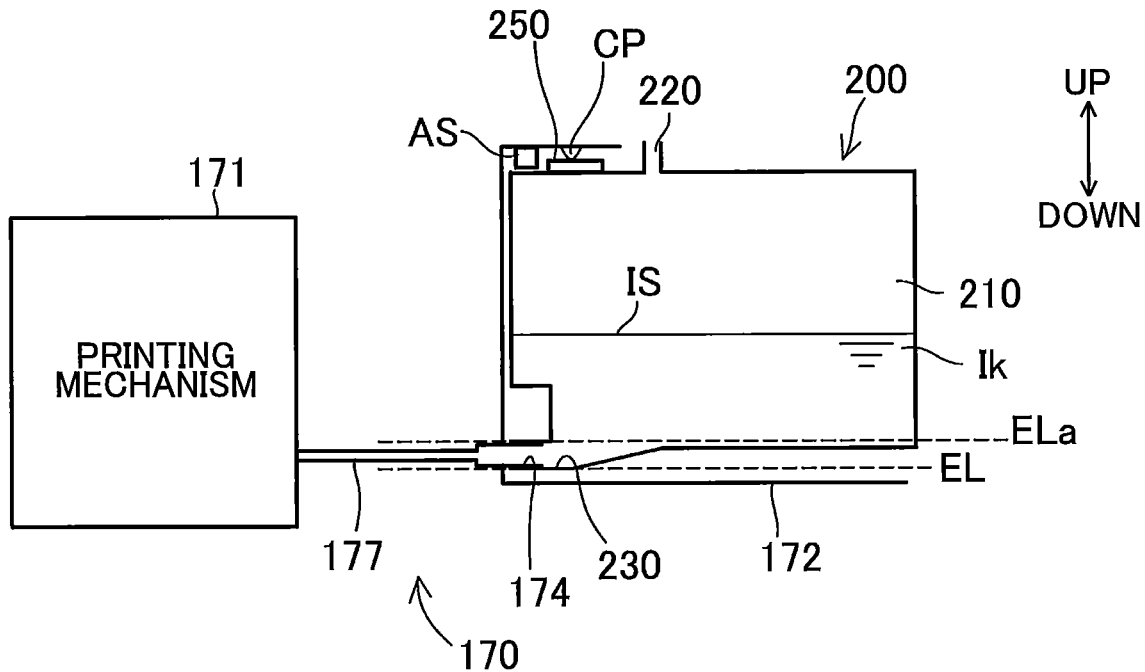
FIG. 2A is a schematic diagram illustrating a structure of a print executing unit of a printer having a single-chamber supply system and constituting the system according to the first embodiment, and particularly illustrating a normal state of an ink cartridge mounted in the print executing unit.
Figure 2B:
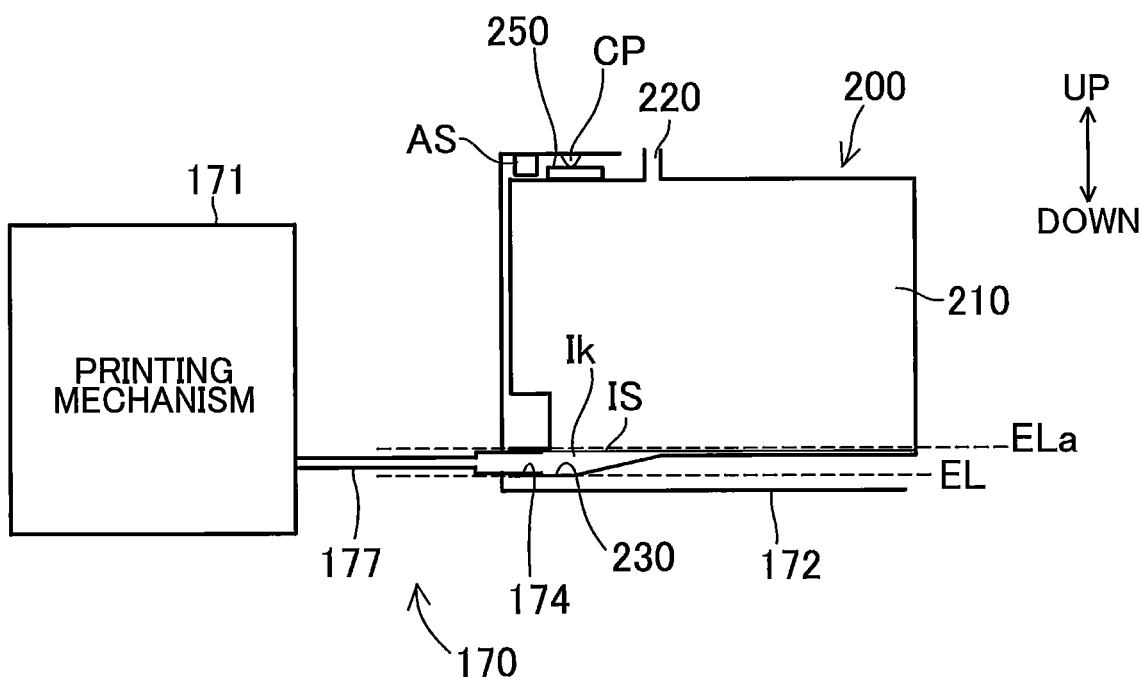
FIG. 2B is a schematic diagram illustrating the structure of the print executing unit of the printer having the single-chamber supply system and constituting the system according to the first embodiment, and particularly illustrating an empty state of the ink cartridge mounted in the print executing unit.

The print executing unit 170 executes printing operations under the control of the CPU 110. FIGS. 2A and 2B are schematic diagrams illustrating the structures of the print executing unit 170 according to the first embodiment. As illustrated in FIGS. 2A and 2B, the print executing unit 170A is provided with a printing mechanism 171, a mounting portion 172, an ink supply opening 174, and an ink channel section 177.

The printing mechanism 171 is an inkjet-type printing mechanism that prints images on paper constituting a printing medium using ink supplied from an ink cartridge 200 as the printing agent. Specifically, the printing mechanism 171 forms images on paper by ejecting ink onto the paper from nozzles formed in a print head (not illustrated) to form dots on the paper. The printing mechanism 171 in the present embodiment prints color images using a plurality of colors of ink Ik, such as the four ink colors cyan (C), magenta (M), yellow (Y), and black (K). To avoid making the drawings too complicated, FIGS. 2A and 2B illustrates the mounting portion 172, ink supply opening 174, and ink channel section 177 for only a single color of ink Ik. However, the print executing unit 170 actually includes four each of the mounting portions 172, ink supply openings 174, and ink channel sections 177 for the corresponding four colors of ink Ik. Further, four ink cartridges 200 respectively accommodating the four colors of ink Ik are mounted in the corresponding mounting portions 172 of the print executing unit 170.

Formed in the ink cartridge 200 are a storage chamber 210 for accommodating ink Ik, an air hole 220, and an ink outlet 230. The air hole 220 is an opening providing communication between the storage chamber 210 and the external air. The ink outlet 230 is an opening through which the ink Ik is supplied from the storage chamber 210 to the print executing unit 170. The ink outlet 230 is provided near the bottom of the storage chamber 210 so as to be capable of supplying all of the ink Ik in the storage chamber 210 into the print executing unit 170.

An integrated circuit chip (hereinafter called an "IC chip") 250 is mounted on the outer surface of the ink cartridge 200. The IC chip 250 has a memory for storing various information about the ink cartridge 200. The information stored in the memory of the IC chip 250 in the present embodiment includes information specifying an initial ink volume IV constituting the quantity of ink Ik accommodated in a new ink cartridge 200, and identification information (a serial number, for example) identifying the ink cartridge 200.

The mounting portion 172 is a holder, for example, in which the ink cartridge 200 is detachably mountable. The ink supply opening 174 is in connection with the ink outlet 230 of the ink cartridge 200 mounted in the mounting portion 172, and the print executing unit 170 communicates with the storage chamber 210 of the ink cartridge 200 via the ink supply opening 174 and ink outlet 230. The ink Ik in the storage chamber 210 is supplied into the print executing unit 170 through the ink supply opening 174. The mounting portion 172 has a contact CP that contacts an electrode on the IC chip 250 of the ink cartridge 200 when the ink cartridge 200 is mounted in the mounting portion 172. The printer 100 (the CPU 110) can read information stored in the memory of the IC chip 250 or write information to the memory of the IC chip 250 through the contact CP.

A mounting sensor AS is provided in the mounting portion 172 for detecting whether the ink cartridge 200 is mounted in the mounting portion 172. The mounting sensor AS is provided with a light-emitting unit for emitting light, and a light-receiving unit for receiving the light emitted from the light-emitting unit, for example. When the ink cartridge 200 is mounted in the mounting portion 172, a rib (not illustrated) formed on the housing of the ink cartridge 200 is disposed in a position for blocking light traveling from the light-emitting unit toward the light-receiving unit. The light-receiving unit of the mounting sensor AS outputs an electric signal to the CPU 110 indicating whether light has been received. The electric signal specifying that light has been received is a signal indicating that the ink cartridge 200 is not mounted (hereinafter called an "unmounted signal"), while the electric signal indicating that light was not received is a signal indicating that the ink cartridge 200 is mounted (hereinafter called a "mounted signal"). Various other configurations may be applied to the mounting sensor AS, such as a configuration for detecting that the contact CM is in contact with the electrode of the IC chip 250, for example.

Hereinafter, "upstream" and "downstream" are used with respect to an ink supply direction from the ink cartridge 200 to the print executing unit 170. The upstream end of the ink channel section 177 is connected to the ink supply opening 174, while the downstream end is connected to a print head (not illustrated) in the printing mechanism 171. With this configuration, the ink cartridge 200 is in communication with the printing mechanism 171, and ink Ik in the ink cartridge 200 (the main storage chamber 210) is supplied to the printing mechanism 171 through the ink channel section 177.

As is clear from the above description, the print executing unit 170 employs a single-chamber supply system, unlike a print executing unit 170A to be described in a second embodiment. A single-chamber supply system does not provide an intermediate tank along the path of ink Ik flowing from the ink cartridge 200 to the printing mechanism 171. The print executing unit 170A according to the second embodiment employs a double-chamber supply system and will be described later.

FIG. 2A illustrates the state of ink Ik in the ink cartridge 200 prior to a level IS of the ink Ik reaching a first empty level ELa (hereinafter also called the "normal state"). FIG. 2B illustrates the state of ink Ik in the ink cartridge 200 when the level IS of ink Ik has reached the first empty level ELa (hereinafter also called the "empty state").

With a single-chamber supply system, the printing mechanism 171 becomes unable to execute printing operations prior to the ink cartridge 200 running out of ink Ik. Specifically, the problem of air becoming mixed in with ink Ik supplied to the printing mechanism 171 may occur when the residual quantity of ink Ik in the ink cartridge 200 is slight. Therefore, printing with the printing mechanism 171 must be halted while the remaining ink Ik in the ink cartridge 200 is at least a quantity sufficient to prevent air from entering the ink Ik.

Therefore, in the single-chamber supply system, the first empty level ELa (see FIGS. 2A and 2B) is set above a second empty level EL (see FIGS. 2A and 2B) at which the ink cartridge 200 runs out of ink Ik. The empty state illustrated in FIG. 2B may be considered the state in which the residual quantity of ink Ik in the ink cartridge 200 is less than a reference, while the normal state illustrated in FIG. 2A may be considered the state in which the residual quantity of ink Ik is greater than or equal to the reference. In other words, the residual quantity of ink Ik in the ink cartridge 200 reaches the reference and the state of ink Ik in the ink cartridge 200 transits from the normal state to the empty state when the level IS of ink Ik reaches the first empty level ELa as illustrated in FIG. 2B.

With a single-chamber supply system, ink Ik would be wasted if the ink cartridge 200 were replaced while the state of ink Ik in the ink cartridge 200 is in the normal state. Thus, in the case of a single-chamber supply system, the ink cartridge 200 is preferably replaced during the empty state of ink Ik.

The information database D3 stores printer information related to the printer 100. Printer information includes information specifying the serial number and model name, for example. The model name is information identifying the model of the printer 100, such as a model number or model code. Printer information also includes ink information related to the ink Ik, and history information related to the printing history, for example. The ink information may include the initial ink volume IV, a residual ink volume RV, and a residual ink percentage IR for each of the CMYK ink cartridges 200, for example. The history information is information related to the printing history, such as the number of printed pages printed within a specific period, and the total number of printed pages.

The printer 100 (the CPU 110) maintains the printer information in the information database D3 at the latest information by updating the history information and ink information stored in the information database IB each time a printing operation is executed, for example. The initial ink volume IV may be acquired from the memory on the IC chip 250 of the ink cartridge 200, for example. Each time the ink cartridge 200 is replaced, the printer 100 records the initial ink volume IV of ink Ik corresponding to the ink cartridge 200 as the residual ink volume RV of the corresponding ink Ik, for example. Each time a printing operation is executed, the printer 100 calculates the residual ink volume RV after execution of the printing operation by calculating the consumed quantity of ink Ik and subtracting this quantity from the residual ink volume RV prior to execution of the printing operation. The printer 100 further calculates the residual ink percentage IR by dividing the residual ink volume RV by the initial ink volume IV. Each time a printing operation is executed, the printer 100 also updates the residual ink volume RV and residual ink percentage IR recorded in the information database D3 to the residual ink volume RV and residual ink percentage IR following the executed printing operation. In the present embodiment, a residual ink percentage IR of 100% denotes the state in which the residual ink volume RV in the ink cartridge 200 is the initial ink volume IV, while a residual ink percentage IR of 0% corresponds to the empty state in which the residual ink volume RV in the ink cartridge 200 is less than or equal to the reference (see FIG. 2B).

In other words, in the present embodiment, the initial ink volume IV is set to denote the quantity of ink Ik stored above the first empty level ELa in the ink cartridge 200 and the reference is set to zero so that the residual ink volume RV becomes zero and the residual ink percentage IR becomes 0% when the level IS of ink Ik in the ink cartridge 200 reaches the first empty level ELa. Alternatively, the initial ink volume IV may be the initial fill quantity of ink Ik stored in the ink cartridge 200. In this case, the reference is set to a non-zero value corresponding to the quantity of ink Ik stored below the first empty level Ela in the ink cartridge 200.

The management server 300 illustrated in FIG. 1 is a computer owned by the company that manages the plurality of printers 100 constituting the system 1000. The management server 300 is provided with a CPU 310 serving as the controller of the management server 300; a volatile storage 320, such as a DRAM; a nonvolatile storage 330, such as a hard disk drive or a flash memory; and a communication interface 380.

The communication interface 380 is connected to the internet IT. As with the communication interface 180 of the printer 100, the communication interface 380 is a wired interface conforming with Ethernet (registered trademark) or a wireless interface conforming with Wi-Fi technology or a standard based on the Wi-Fi technology.

The CPU 310 is a processor that performs data processes. The volatile storage 320 provides a buffer region for temporarily storing various intermediate data generated when the CPU 310 performs processes. The nonvolatile storage 330 stores a computer program PG2, and a management database PD.

The computer program PG2 is an application program provided in a downloadable format from a vendor server. Here, the vender server is a server provided by the company that manages the system 1000 or the vendor that manufactures the plurality of printers 100 constituting the system 1000. Alternatively, the computer program PG2 may be provided in a recorded format, such as on a CD-ROM, or may be pre-stored in the nonvolatile storage 330 when the management server 300 is manufactured.

By executing the computer program PG2, the management server 300 (the CPU 310) can execute processes described later related to management of the plurality of printers 100 in the system 1000, such as a management process.

The management database PD records printer information collected by the management server 300. FIG. 3 illustrates an example of the management database PD according to the present embodiment. As illustrated in FIG. 3, the management database PD includes a plurality of entries EN respectively corresponding to the plurality of printers 100 in the system 1000. FIG. 3 illustrates only entries EN1 and EN2 corresponding to two of the printers 100 as a representative.

The entry EN1 includes a plurality of printer information items for a corresponding printer 100, and specifically a serial number, a model name, a delivery destination ID, and ink-related information for the ink Ik. The serial number is information for identifying the printer 100. The model name is a name specifying the model of the printer 100.

A delivery destination ID is assigned to each destination for delivering replacement ink cartridges 200 described later, such as an ID assigned to each customer of the company managing the management server 300. Information specifying the delivery destination (not illustrated in the drawings), such as the recipient's name and address, is assigned to each ID in advance.

The ink-related information includes an order flag, a previous final residual ink percentage FR, and ink history information for each CMYK color of ink Ik.

The order flag indicates whether a replacement ink cartridge 200 has been ordered for the corresponding ink color. A replacement ink cartridge 200 is an ink cartridge 200 to be used following replacement of the in-use ink cartridge 200 currently mounted in the mounting portion 172. The order flag is set to one of the values "ON" and "OFF". The value "ON" specifies that a replacement ink cartridge 200 has been ordered or ordering of a replacement ink cartridge 200 has been determined, while the value "OFF" specifies that a replacement ink cartridge 200 has not been ordered and ordering of a replacement ink cartridge 200 has not been determined.

The previous final residual ink percentage FR specifies the final residual ink percentage IR of ink Ik in the used ink cartridge 200 that was mounted in the mounting portion 172 prior to the in-use ink cartridge 200 currently mounted in the mounting portion 172. In other words, the previous final residual ink percentage FR indicates the quantity of ink Ik remaining in the used ink cartridge 200 at the moment the used ink cartridge 200 was replaced with the current in-use ink cartridge 200.

The ink history information is information on the residual ink percentage IR for each color of ink Ik acquired from each of the printers 100 and recorded in association with the dates and times that the residual ink percentages IR were acquired (acquisition dates and times) in a management process described later. Since residual ink percentages IR are acquired periodically, a plurality of residual ink percentages IR and their corresponding acquisition dates and times are recorded in the management database PD as ink history information for each of the CMYK colors of ink Ik. Hereinafter, we may abbreviate "date and time" to "date/time". For example, the acquisition date and time may be abbreviated to the acquisition date/time, as illustrated in FIG. 3.

Of the printer information recorded in the management database PD, the serial numbers, model names, and delivery destination IDs pre-assigned by the company managing the system 1000 are items that each printer 100 under management transmits automatically to the management server 300 in a prescribed registration process performed when operations of the system 1000 are initiated, for example. The management server 300 records acquired serial numbers, model names, and delivery destination IDs in the management database PD, thereby registering the plurality of printers 100 to be managed.

A-2. Operations of the System 1000

A-2-1. Ink Information Transmission Process

Each of the printers 100 under management executes an ink information transmission process to transmit ink information to the management server 300 automatically. The ink information transmission process is executed continuously while the printer 100 is running.

Figure 4:
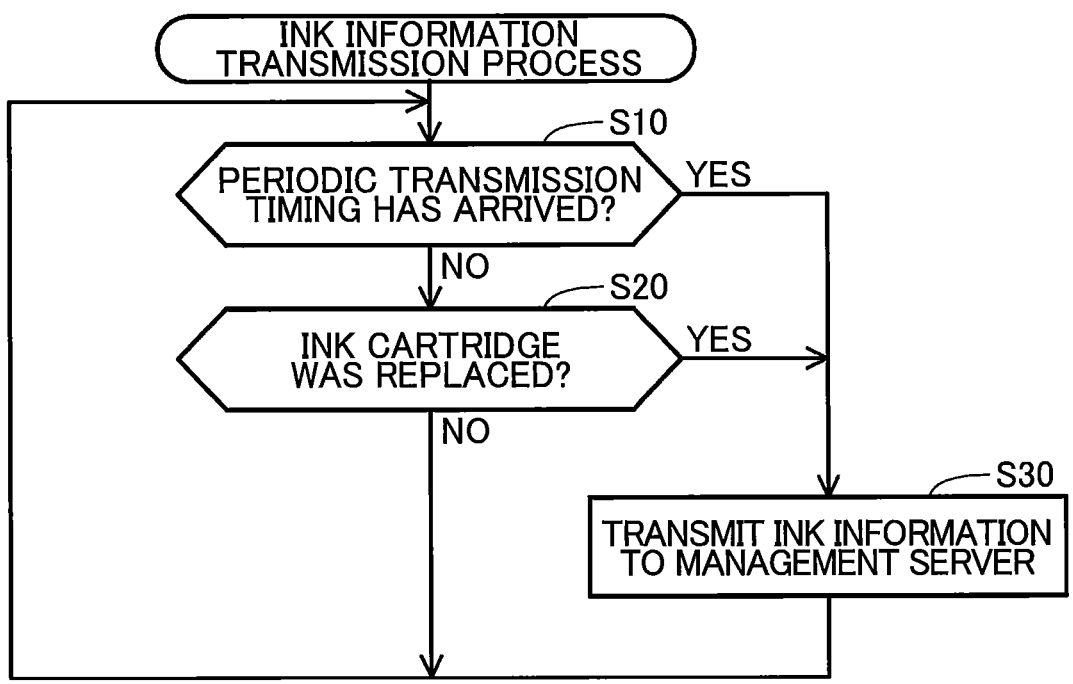
FIG. 4 is a flowchart illustrating steps in an ink information transmission process executed by the printer according to the first embodiment.

FIG. 4 is a flowchart illustrating steps in the ink information transmission process. In S10 of FIG. 4, the printer 100 (the CPU 110) determines whether a periodic transmission timing has arrived. For example, the periodic transmission timing is set to predetermined times with a frequency of one to multiple times per day.

If the periodic transmission timing has arrived (S10: YES), in S30 the printer 100 transmits ink information to the management server 300. The ink information transmitted at the periodic transmission timing includes the residual ink percentage IR for each CMYK color of ink Ik, and information identifying the printer 100 from which the ink information is transmitted (source printer 100), specifically a serial number and a model name.

If the periodic transmission timing has not arrived (S10: NO), in S20 the printer 100 determines whether the ink cartridge 200 for at least one of the CMYK colors of ink Ik was replaced. The printer 100 can detect when an ink cartridge 200 is removed from the mounting portion 172 and when an ink cartridge 200 is mounted in the mounting portion 172 on the basis of electric signals outputted by the mounting sensor AS described above. If the printer 100 detects that an ink cartridge 200 was mounted in the mounting portion 172, the printer 100 acquires the serial number from the IC chip 250 of the ink cartridge 200. If the serial number of the mounted ink cartridge 200 differs from the serial number of the ink cartridge 200 previously mounted in the mounting portion 172, the printer 100 determines that the ink cartridge 200 was replaced.

If the ink cartridge 200 was replaced (S20: YES), in S30 the printer 100 transmits ink information to the management server 300. Here, the ink information transmitted when an ink cartridge 200 was replaced includes the residual ink percentage IR (normally 100%) for the replacement ink cartridge 200, and the previous final residual ink percentage FR for the ink cartridge 200 that was replaced with the replacement ink cartridge 200, i.e., the previously mounted ink cartridge 200. Here, the residual ink percentage IR recorded in the information database IB just prior to the replacement of the ink cartridge 200 is transmitted to the management server 300 as the previous final residual ink percentage FR for the previously mounted ink cartridge 200. The replacement ink cartridge 200 is an example of the first cartridge of the present disclosure, and the previously mounted ink cartridge 200 is an example of the second cartridge of the present disclosure.

If the printer 100 does not detect replacement of an ink cartridge 200 (S20: NO), the printer 100 returns to S10.

A-2-2. Management Process

The management server 300 (the CPU 310) executes a management process for managing residual percentages of ink Ik in the printers 100 under management and to order replacement ink cartridges 200. The management process is executed continuously while the management server 300 is running.

Figure 5:
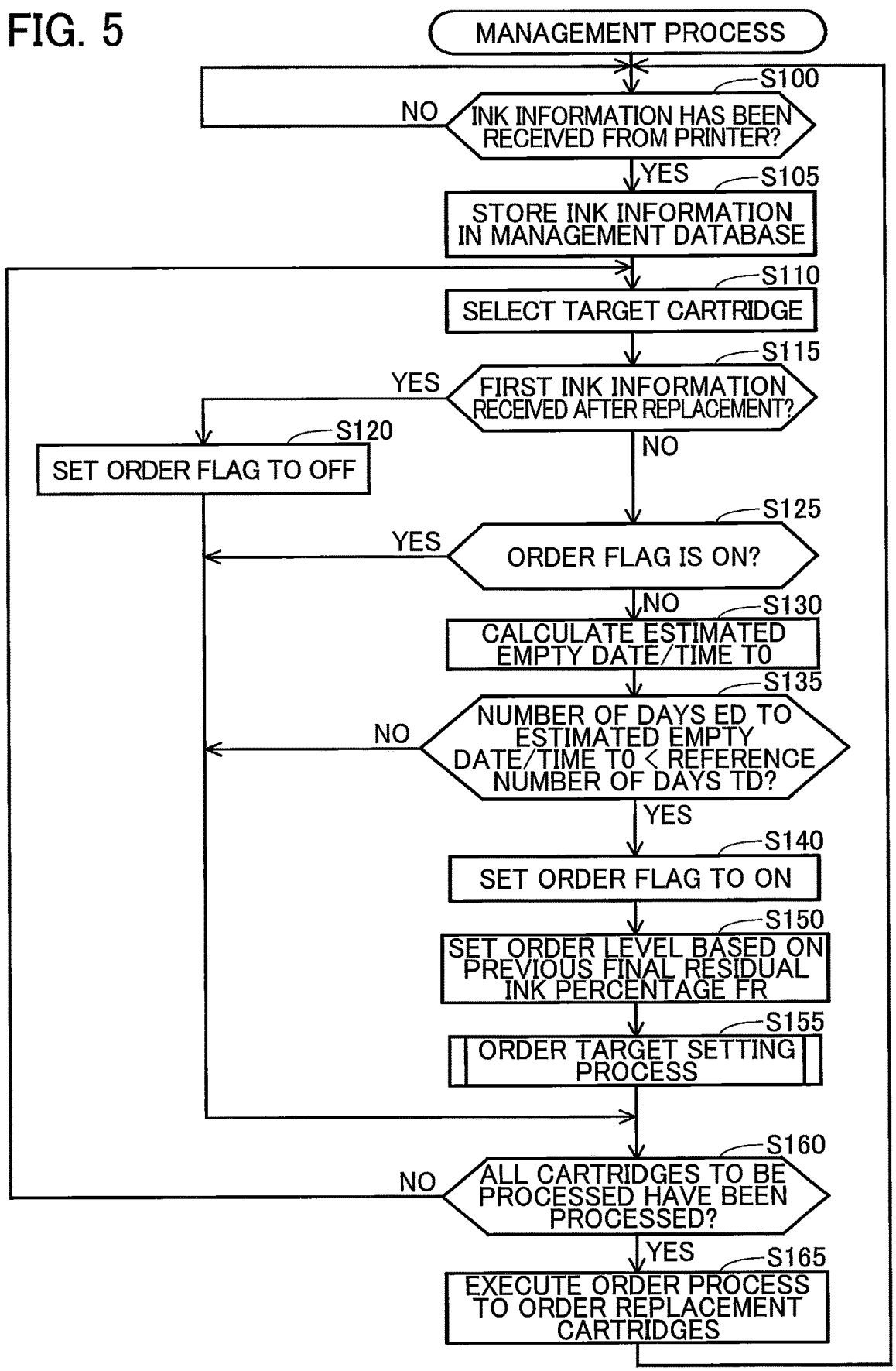
FIG. 5 is a flowchart illustrating steps in a management process executed by the management server according to the first embodiment.

FIG. 5 is a flowchart illustrating steps in the management process according to the first embodiment. In S100 of FIG. 5, the management server 300 determines whether ink information has been received from one of the printers 100 under management. The management server 300 continues to wait while ink information has not been received (S100: NO). When ink information has been received (S100: YES), the management server 300 executes the process in S105 to S165 described next.

In S105 the management server 300 stores the ink information received from the printer 100 in the management database PD. The management server 300 identifies the corresponding entry EN in the management database PD on the basis of the serial number and model name of the printer 100 included in the ink information and records the ink information in the identified entry EN. The date and time that the ink information was received is recorded as an acquisition date/time in association with the residual ink percentage IR included in the ink information (see FIG. 3).

In S110 the management server 300 selects one of the ink cartridges 200 corresponding to the ink information received above as a target cartridge. Since the ink information received at periodic transmission timings from the source printer 100 include residual ink percentages IR for four ink cartridges 200 corresponding to the four colors C, M, Y, and K of ink Ik, the management server 300 selects one of these four ink cartridges 200 as the target cartridge. On the other hand, ink information received when one or more ink cartridge 200 were replaced includes residual ink percentages IR for one or more ink cartridges 200, with which one or more ink cartridges 200 which had been previously mounted were just replaced respectively, among four ink cartridges 200 mounted in the source printer 100. Accordingly, the management server 300 selects one of these one or more ink cartridges 200 as the target cartridge.

In S115 the management server 300 determines whether the ink information received above is the ink information received for the first time after an ink cartridge 200 was replaced. For example, the management server 300 determines that ink information is the first ink information received after an ink cartridge 200 was replaced when the ink information includes the previous final residual ink percentage FR.

If the ink information is the first information received after replacement of an ink cartridge 200 (S115: YES), in S120 the management server 300 sets the order flag corresponding to the target cartridge to "OFF" and advances to S160 described later. Since the order flag has been set to "ON" when a replacement ink cartridge 200 is ordered, the order flag is normally still "ON" at the time the ink cartridge 200 is replaced. Therefore, the order flag is reset to "OFF" at this time.

However, if the ink information is not the first information received after an ink cartridge 200 was replaced (S115: NO), in S125 the management server 300 determines whether the order flag corresponding to the target cartridge is "ON." If the order flag corresponding to the target cartridge is "ON" (S125: YES), the management server 300 advances to S160 since a replacement ink cartridge 200 for replacement with the target cartridge has already been ordered or decided to be ordered.

Figure 6:
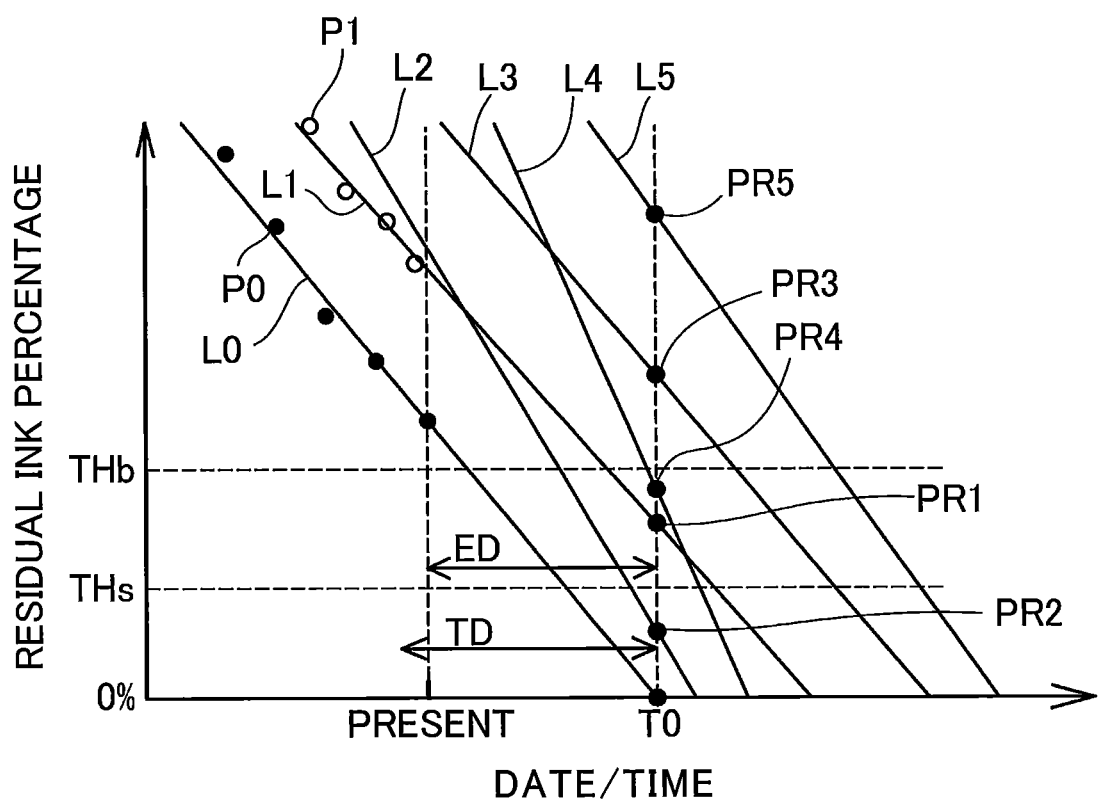
FIG. 6 is a graph illustrating a relationship between residual ink percentage and date/time according to the first embodiment.

However, if the order flag corresponding to the target cartridge is "OFF" (S125: NO), in S130 the management server 300 calculates an estimated empty date/time T0 using the ink history information recorded in the management database PD. FIG. 6 is a graph illustrating the relationship between the residual ink percentage IR (vertical axis) and the date/time (horizontal axis) according to the first embodiment. A plurality of dots P0 in the graph indicate points obtained by plotting the plurality of residual ink percentages IR included in the ink history information for the target cartridge at positions along the horizontal axis corresponding to their acquisition dates/times. The management server 300 sets an approximation line L0 indicating the transition of residual ink percentage IR over time based on the plurality of residual ink percentages IR acquired to the present. The management server 300 sets the estimated empty date/time T0 to the date/time at which the residual ink percentage IR will become 0% according to the approximation line L0. The estimated empty date/time T0 may be considered the date/time on which ink Ik in the target cartridge reaches the empty state described above.

In S135 the CPU 310 determines whether a number of days ED from the present to the estimated empty date/time T0 is less than a prescribed reference number of days TD. The reference number of days TD is set to the number of delivery days plus some additional days (plus one day, for example) on the basis of the number of days needed for a replacement ink cartridge 200 to reach the user of the printer 100 under management after the replacement ink cartridge 200 is ordered, for example. The number of days ED in the example of FIG. 6 is determined to be less than the reference number of days TD. The order condition for ordering a replacement ink cartridge 200 is that the number of days ED to the estimated empty date/time T0 be less than the reference number of days TD.

If the number of days ED from the present to the estimated empty date/time T0 is greater than or equal to the reference number of days TD (S135: NO), the management server 300 advances to S160 since the management server 300 determines that the timing for ordering a replacement ink cartridge 200 has not yet arrived. However, if the number of days ED from the present to the estimated empty date/time T0 is less than the reference number of days TD (S135: YES), the management server 300 determines that the timing for ordering a replacement ink cartridge 200 has arrived. Accordingly, in S140 the management server 300 sets the order flag corresponding to the target cartridge to "ON". In other words, the target cartridge is set as an ink cartridge 200 to be replaced (a replacement target ink cartridge 200 to be replaced with a replacement ink cartridge 200).

In S150 the management server 300 sets an order level based on the previous final residual ink percentage FR for the target cartridge. In the present embodiment, the management server 300 sets the order level to "high" when the previous final residual ink percentage FR is 0% and "low" when the previous final residual ink percentage FR is greater than 0%. Here, a default of 0% is used as the previous final residual ink percentage FR when the target cartridge is the first ink cartridge 200 used in the printer 100, since a previous final residual ink percentage FR cannot be acquired from the printer 100 in this case. Accordingly, if the target cartridge is the first ink cartridge 200 used in the printer 100, the management server 300 sets the order level to "high" in this step. That is, when a previous final residual ink percentage FR has not been recorded in the management database PD, the management server 300 sets the order level to the default level ("high" in the present embodiment).

In S155 the management server 300 executes an order target setting process. The order target setting process is performed to determine ink cartridges 200 for which replacement ink cartridges 200 should be ordered together with the target cartridge and for setting the order flags for these ink cartridges 200 to "ON". The order target setting process will be described later.

In S160 the management server 300 determines whether all ink cartridges 200 to be processed, i.e., the ink cartridges 200 corresponding to all residual ink percentages IR included in the ink information received from the printer 100 have been processed as the target cartridge. If there remain any unprocessed ink cartridges 200 (S160: NO), the management server 300 returns to S110 and selects one of the unprocessed ink cartridges 200 to be the target cartridge.

When all ink cartridges 200 to be processed have been processed (S160: YES), in S165 the management server 300 executes an order process to order replacement ink cartridges 200 for the one or more cartridges 200 whose order flags are set to "ON" during the processes from S105 to S160 for the ink information received in S100, and subsequently returns to S100. Specifically, the management server 300 transmits order information for ordering one or more replacement ink cartridges 200 to the shipping company that ships ink cartridges 200. The order information may include codes specifying the types of the ink cartridges 200 being ordered, and information specifying the delivery destination for the ink cartridges 200 (the name and address of the recipient, for example). In response, the shipping company delivers the one or more replacement ink cartridges 200 to the user of the printer 100.

A-2-3. Order Target Setting Process

Figure 7:
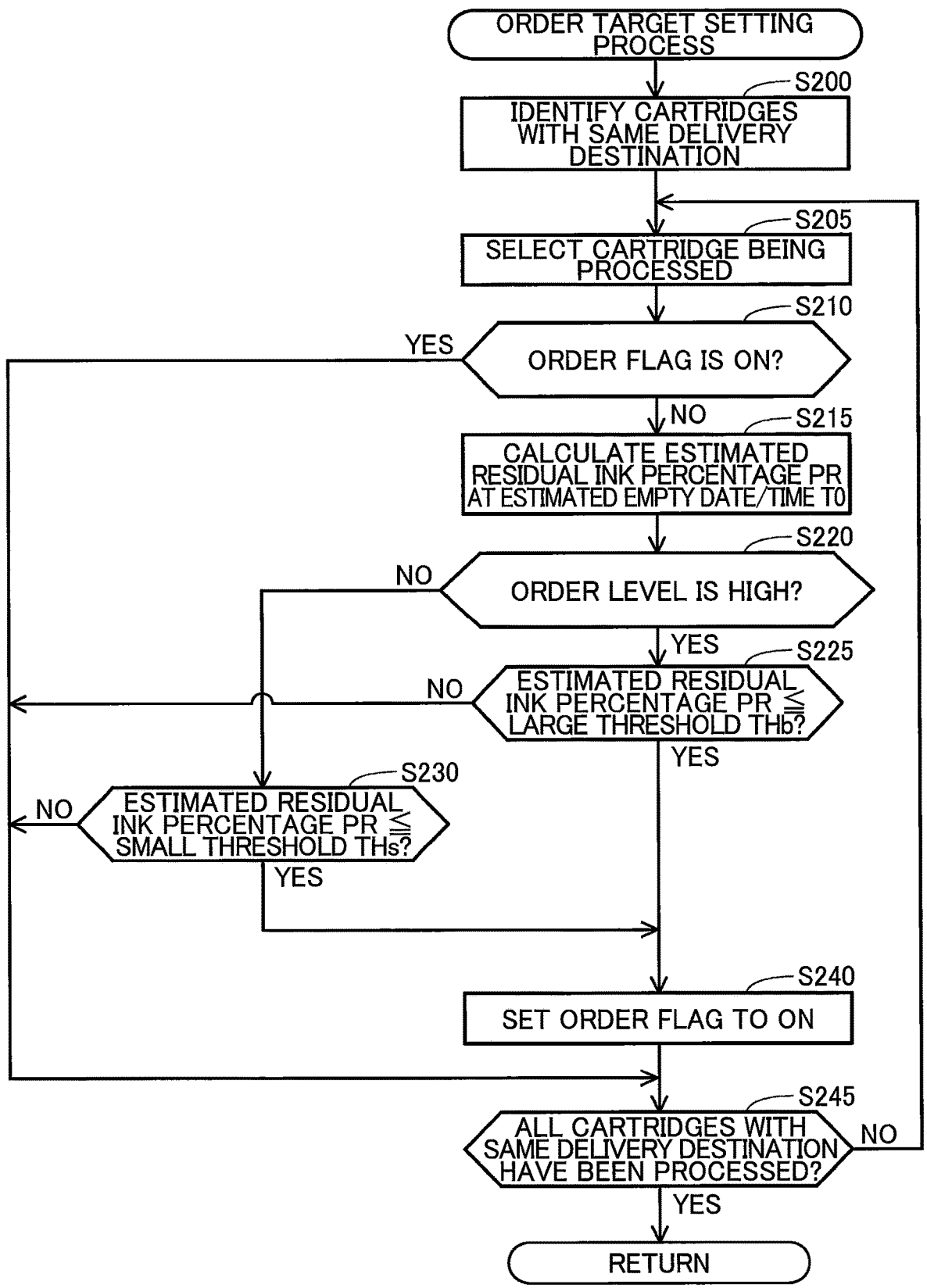
FIG. 7 is a flowchart illustrating steps in an order target setting process executed by the management server according to the first embodiment.

Next, the order target setting process of S155 in FIG. 5 will be described. FIG. 7 is a flowchart illustrating steps in the order target setting process according to the first embodiment. In S200 of FIG. 7, the management server 300 identifies, among a plurality of ink cartridges 200 for the plurality of printers 100 under management, one or more ink cartridges 200 having the same delivery destination as that of the target cartridge. Specifically, the management server 300 references the management database PD and identifies one or more ink cartridges 200 correlated with the same delivery destination ID as that of the target cartridge. For example, assume that the target cartridge is the C ink cartridge 200 mounted in a first printer 100 having four mounting portions 172 for CMYK colors of ink Ik. In this case, at least the three MYK ink cartridges 200 in the first printer 100 are identified as ink cartridges 200 having the same delivery destination. In addition, the four CMYK ink cartridges 200 of a second printer 100 correlated with the same delivery destination ID as that of the first printer 100 are identified as ink cartridges 200 with the same delivery destination. If a large number of printers 100 have the same delivery destination ID, a large number of ink cartridges 200 may be identified in this step. To avoid making the description too complicated, the following example will assume that five ink cartridges 200 are identified in this step.

In S205 the management server 300 selects one of the five ink cartridges 200 having the same delivery destination to be the ink cartridge 200 being processed. In S210 the management server 300 determines whether the order flag corresponding to the ink cartridge 200 being processed is "ON". If the order flag for the ink cartridge 200 being processed is "ON" (S210: YES), the management server 300 advances to S245 since a replacement ink cartridge 200 for replacement with the ink cartridge 200 being processed has already been ordered or the ink cartridge 200 being processed has already been set as an ink cartridge 200 to be replaced (the replacement target ink cartridge 200).

However, if the order flag for the ink cartridge 200 being processed is set to "OFF" (S210: NO), in S215 the management server 300 calculates an estimated value for the residual ink percentage IR (an estimated residual ink percentage PR) for the ink cartridge 200 being processed at the estimated empty date/time T0 of the target cartridge. A plurality of white circles P1 in the graph of FIG. 6 are the points obtained by plotting the plurality of residual ink percentages IR included in the ink history information for one ink cartridge 200 having the same delivery destination at positions along the horizontal axis corresponding to their acquisition dates/times. The management server 300 sets an approximation line (the approximation line L1 in the example of FIG. 6) indicating the transition of residual ink percentage IR over time based on the plurality of residual ink percentages IR acquired to the present for the ink cartridge 200 being processed. The management server 300 calculates the estimated residual ink percentage PR of the ink cartridge 200 being processed (the estimated residual ink percentage PR1 in the example of FIG. 6) at the estimated empty date/time T0 of the target cartridge according to this approximation line (the approximation line L1). FIG. 6 illustrates approximation lines L1 to L5 indicating the transition of residual ink percentage IR for each of the five ink cartridges 200 having the same delivery destination as that of the target cartridge, and their corresponding estimated residual ink percentages PR1 to PR5 at the estimated empty date/time T0 for the target cartridge.

In S220 the management server 300 determines whether the order level set in S150 of FIG. 5 is "high." If the order level is "high" (S220: YES), in S225 the management server 300 determines whether the estimated residual ink percentage PR calculated in S215 is less than or equal to a large threshold THb. If the estimated residual ink percentage PR is less than or equal to the large threshold THb (S225: YES), in S240 the management server 300 sets the order flag for the ink cartridge 200 being processed to "ON." That is, the ink cartridge 200 being processed is set as an ink cartridge 200 to be replaced (a replacement target ink cartridge 200). In the example of FIG. 6, the estimated residual ink percentages PR1, PR2, and PR4 are all less than the large threshold THb. Therefore, when an ink cartridge 200 from among the five ink cartridges 200 with the same delivery destination as that of the target cartridge and corresponding to one of the estimated residual ink percentages PR1, PR2, and PR4 is set as the ink cartridge 200 being processed, the corresponding flag is set to "ON."

If the estimated residual ink percentage PR is greater than the large threshold THb (S225: NO), the management server 300 skips S240 and advances to S245. In other words, the order flag corresponding to the ink cartridge 200 being processed is maintained at "OFF" in this case. Hence, the ink cartridge 200 being processed is not set as an ink cartridge 200 to be replaced (a replacement target ink cartridge 200). In the example of FIG. 6, the estimated residual ink percentages PR3 and PR5 are greater than the large threshold THb. Therefore, when an ink cartridge 200 from among the five ink cartridges 200 having the same delivery destination as that of the target cartridge and corresponding to one of the estimated residual ink percentages PR3 and PR5 is set as the ink cartridge 200 being processed, the corresponding flag is left at "OFF."

On the other hand, if the management server 300 determines in S220 that the order level is "low" (S220: NO), in S230 the management server 300 determines whether the estimated residual ink percentage PR calculated in S215 is less than or equal to a small threshold THs. If the estimated residual ink percentage PR is less than or equal to the small threshold THs (S230: YES), in S240 the management server 300 sets the order flag corresponding to the ink cartridge 200 being processed to "ON." In other words, the ink cartridge 200 being processed is set as an ink cartridge 200 to be replaced (a replacement target ink cartridge 200). In the example of FIG. 6, the estimated residual ink percentage PR2 is less than the small threshold THs. Hence, when the ink cartridge 200 corresponding to the estimated residual ink percentage PR2 is set as the ink cartridge 200 being processed, the corresponding flag is set to "ON."

However, if the estimated residual ink percentage PR is greater than the small threshold THs (S230: NO), the management server 300 skips S240 and advances to S245. In other words, the order flag corresponding to the ink cartridge 200 being processed is maintained at "OFF." Hence, the ink cartridge 200 being processed is not set as an ink cartridge 200 to be replaced (a replacement target ink cartridge 200). In the example of FIG. 6, the estimated residual ink percentages PR1 and PR3 to PR5 are all greater than the small threshold THs. Therefore, if the ink cartridge 200 corresponding to one of the estimated residual ink percentages PR1 and PR3 to PR5 is set as the ink cartridge 200 being processed, the corresponding flag is kept at "OFF."

In S245 the management server 300 determines whether all ink cartridges 200 having the same delivery destination as that of the target cartridge have been selected as the ink cartridge 200 being processed. When there remain unprocessed ink cartridges 200 (S245: NO), the management server 300 returns to S205 and selects one of the unprocessed ink cartridges 200 to be processed. When all ink cartridges 200 with the same delivery destination as that of the target cartridge have been processed (S245: YES), the management server 300 ends the order target setting process.

According to the first embodiment described above, the management server 300 acquires a residual ink percentage IR specifying the residual quantity of printing agent as a percentage for each of the ink cartridges 200 having the same delivery destination, and a previous final residual ink percentage FR for the one or more used ink cartridges 200 that were mounted in the mounting portion 172 prior to the ink cartridges 200 that are in use (S100 of FIG. 5, FIG. 3). The management server 300 selects a target cartridge from among a plurality of in-use ink cartridges 200 (S110 of FIG. 5), and uses the previous final residual ink percentage FR for the target cartridge to set an order level for each of the in-use ink cartridges 200 having the same delivery destination as that of the target cartridge (S150 of FIG. 5). The order level is set to either "low" when the previous final residual ink percentage FR for the target cartridge is greater than 0%, or "high" when the previous final residual ink percentage FR for the target cartridge is 0%. The management server 300 determines whether an order condition is met on the basis of the residual ink percentage IR for the target cartridge (S130 and S135 of FIG. 5). When the order condition has been met for the target cartridge (S135: YES in FIG. 5), the management server 300 uses the estimated residual ink percentage PR at the estimated empty date/time T0 for the target cartridge as an index value to set ink cartridges 200 to be replaced, i.e., replacement target ink cartridges 200, including the target cartridge, from among the plurality of in-use ink cartridges 200 having the same delivery destination as that of the target cartridge (S140 and S155 in FIG. 5, FIG. 7). As described above in the order target setting process of FIG. 7, the management server 300 can set M-number (where M is an integer equal to or greater than one) replacement target ink cartridges 200 (S230 and S240 of FIG. 6) when the order level is "low" (S220: NO in FIG. 6) and can set N-number (where N is an integer satisfying the relation N M) replacement target ink cartridges 200 (S225 and S240 of FIG. 6) when the order level is "high" (S220: YES in FIG. 6). Using the example of FIG. 6 described above, two ink cartridges 200 including one ink cartridge 200 corresponding to the estimated residual ink percentage PR2 and the target cartridge are set as the replacement target ink cartridges 200 when the order level is "low," and four ink cartridges 200 including the three ink cartridges 200 corresponding to estimated residual ink percentages PR1, PR2, and PR4 and the target cartridge are set as the replacement target ink cartridges 200 when the order level is "high."

By ordering a plurality of replacement ink cartridges 200 together, it is possible to reduce the costs related to preparing replacement ink cartridges 200 since the shipping expense will be less than if the replacement ink cartridges 200 were ordered one by one. On the other hand, when ordering a plurality of replacement ink cartridges 200 together, some of the ink cartridges 200 may be ordered sooner than their optimal order time. Since a replacement ink cartridge 200 ordered earlier than its optimal order time will reach the user of the printer 100 sooner than the optimal replacement time, the user might replace the ink cartridge 200 earlier than its optimal replacement time. The optimal replacement time is a timing that does not waste ink Ik in the in-use ink cartridge 200 while avoiding a period in which the printer 100 cannot execute printing operations due to the in-use ink cartridge 200 running out of ink Ik and may be the timing directly after the residual ink percentage IR reaches 0%, for example. Consequently, when a plurality of replacement ink cartridges 200 is ordered together, the quantity of wasted ink Ik tends to be greater than when each replacement ink cartridge 200 is ordered at its optimal order time. According to the first embodiment described above, the number of replacement ink cartridges 200 when the previous final residual ink percentage FR is 0% for the target cartridge is equal to or larger than the number of replacement ink cartridges 200 when the previous final residual ink percentage FR is greater than 0% for the target cartridge. Thus, the management server 300 can order a larger number of replacement ink cartridges 200 at the same time when there is a high probability that the ink cartridges 200 will be replaced without wasting ink Ik on the basis of the user's past record of wastage of ink Ik, and can order a smaller number of replacement ink cartridges 200 at the same time when there is a low probability that the ink cartridges 200 will be replaced without wasting ink Ik. Accordingly, the management server 300 can reduce the costs incurred when preparing replacement ink cartridges 200 while suppressing wastage of ink Ik.

According to the first embodiment described above, ink cartridges 200 whose estimated residual ink percentage PR at the estimated empty date/time T0 for the target cartridge is less than or equal to the small threshold THs are set as replacement target ink cartridges 200 (S230 and S240 of FIG. 6) when the order level is "low" (S220: NO in FIG. 6), and ink cartridges 200 whose estimated residual ink percentage PR at the estimated empty date/time T0 for the target cartridge is greater than the small threshold THs and less than or equal to the large threshold THb are set as replacement target ink cartridges 200 (S225 and S240 of FIG. 6) when the order level is "high" (S220: YES in FIG. 6). Thus, a plurality of thresholds can be used to properly set the replacement target ink cartridges 200.

Note that since the estimated residual ink percentage PR for the target cartridge is 0% at the estimated empty date/time T0, the estimated residual ink percentage PR for an ink cartridge 200 having the same delivery destination as that of the target cartridge being less than or equal to the small threshold THs or large threshold THb is equivalent to saying the difference in estimated residual ink percentage PR between the ink cartridge 200 having the same delivery destination as that of the target cartridge and the target cartridge is less than or equal to the threshold THs or THb at the estimated empty date/time T0 of the target cartridge.

If the estimated residual ink percentage PR for an ink cartridge 200 having the same delivery destination as that of the target cartridge at the estimated empty date/time T0 for the target cartridge is too large, for example, the date/time at which ink Ik in the ink cartridge 200 corresponding to that estimated residual ink percentage PR reaches the empty state could be much later than the estimated empty date/time T0 of the target cartridge. Thus, the timing at which this ink cartridge 200 satisfied the order condition would be much later than the timing at which the target cartridge satisfied the order condition (i.e., the present date/time). If a replacement ink cartridge 200 for this ink cartridge 200 were ordered at this time, this ink cartridge 200 might be replaced too early since the replacement ink cartridge 200 would reach the user too early. Consequently, the quantity of wastage of ink Ik could increase in this case. In the present embodiment, only ink cartridges 200 having an estimated residual ink percentage PR less than or equal to the small threshold THs or large threshold THb are set as replacement target ink cartridges 200. Accordingly, replacement target ink cartridges 200 are considered those ink cartridges 200 among the ink cartridges 200 having the same deliver destination as that of the target cartridge that are expected to satisfy the order condition at the timing closer to the timing at which the target cartridge satisfies the order condition (i.e., the present date/time) than ink cartridges 200 that are not to be replaced (ink cartridges 200 other than the replacement target ink cartridges 200) are. Hence, the present embodiment can suppress excessive wastage of ink Ik caused by ink cartridges 200 being replaced too soon.

In the present embodiment described above, replacement target ink cartridges 200 are identified on the basis of their estimated residual ink percentage PR at the estimated empty date/time T0 for the target cartridge. This process enables the management server 300 to identify replacement target ink cartridges 200 more accurately. The estimated residual ink percentage PR for an ink cartridge 200 with the same delivery destination as that of the target cartridge at the estimated empty date/time T0 for the target cartridge may be considered an index value specifying the residual quantity of ink Ik capable of being used for printing operations at a specific timing.

As can be understood from the above description, the ink history information (the residual ink percentage IR for the in-use ink cartridge 200) stored in the management database PD of the present embodiment is an example of the first information of the present disclosure, and the previous final residual ink percentage FR stored in the management database PD of the present embodiment is an example of the second information of the present disclosure. The order level "low" of the present embodiment is an example of the first level of the present disclosure, and the order level "high" of the present embodiment is an example of the second level of the present disclosure.

B. Second Embodiment

B-1. Structure of a Printer Under Management

Each of the printers under management in the second embodiment is provided with a print execution unit 170A in place of the print execution unit 170 of the printer 100 according to the first embodiment. The remaining structure of the printer under management in the second embodiment is identical to the printer 100 according to the first embodiment.

Figure 8A:
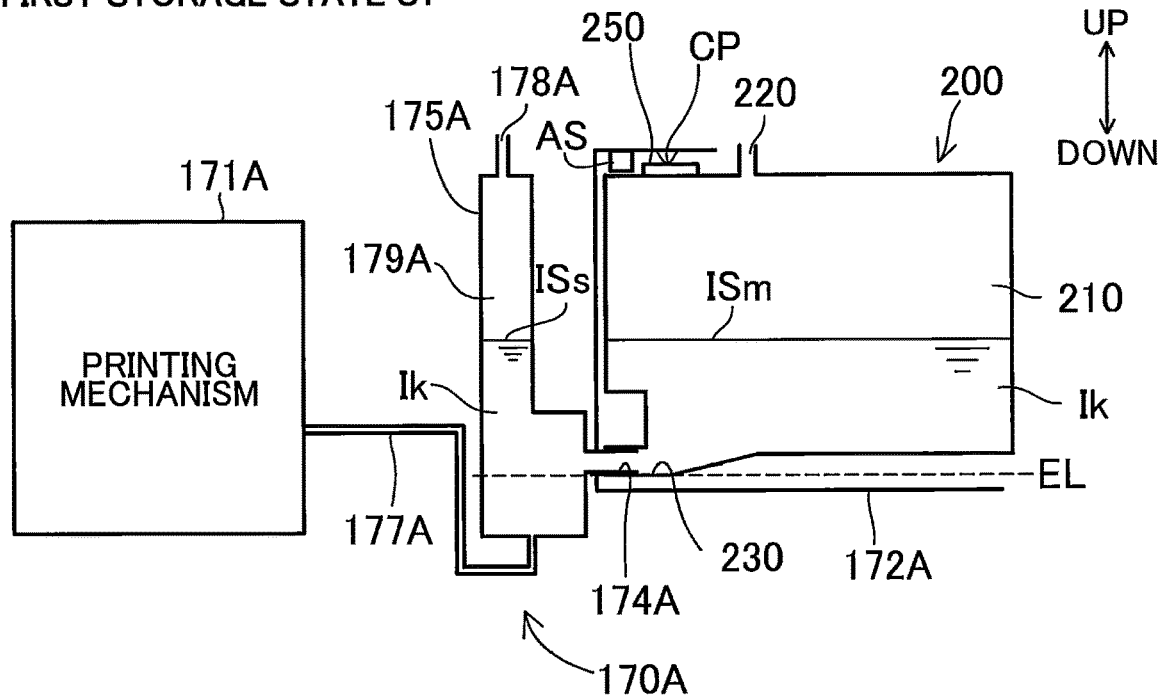
FIG. 8A is a schematic diagram illustrating a structure of a print executing unit of a printer having a double-chamber supply system and constituting a system according to a second embodiment, and particularly illustrating a first storage condition of ink in an ink cartridge mounted in the print executing unit.
Figure 8B:
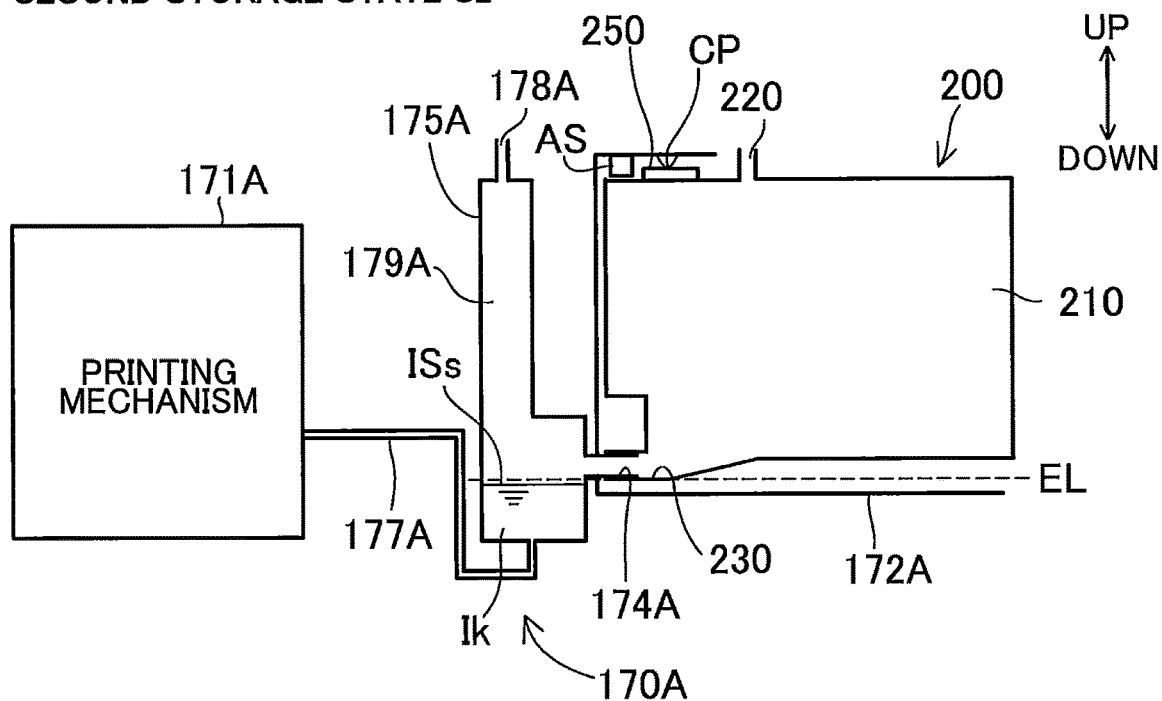
FIG. 8B is a schematic diagram illustrating the structure of the print executing unit of the printer having the double-chamber supply system and constituting the system according to the second embodiment, and particularly illustrating a second storage condition of ink in the ink cartridge mounted in the print executing unit.

FIGS. 8A and 8B are schematic diagrams illustrating the structures of the print executing unit 170A according to the second embodiment. The print executing unit 170A is provided with a printing mechanism 171A, mounting portions 172A, ink supply openings 174A, intermediate tanks 175A, and ink channel sections 177A.

As with the printing mechanism 171 in FIGS. 2A and 2B, the printing mechanism 171A is an inkjet-type printing mechanism that prints color images on paper using ink Ik in the four CMYK colors supplied from ink cartridges 200 respectively mounted in the mounting portions 172A.

The mounting portion 172A is a holder similar to the mounting portion 172 in FIG. 2. The ink supply opening 174A is in connection with the ink outlet 230 of the ink cartridge 200 mounted in the corresponding mounting portion 172, and the print executing unit 170A communicates with the storage chamber 210 of each ink cartridge 200 via the corresponding ink supply opening 174 and ink outlet 230. The ink Ik in the main storage chamber 210 of the ink cartridge 200 is supplied into the print executing unit 170A through the ink supply opening 174A.

An auxiliary storage chamber 179A for accommodating the ink Ik and an air hole 178A are formed in each intermediate tank 175A. The air hole 178A is an opening providing communication between the auxiliary storage chamber 179A and the external air. The auxiliary storage chamber 179A communicates with the main storage chamber 210A of the ink cartridge 200A mounted in the corresponding mounting portion 172A via the ink supply opening 174A, and stores ink Ik supplied from the ink cartridge 200A through the ink supply opening 174A.

The upstream end of the ink channel section 177A is connected to the bottom surface of the auxiliary storage chamber 179A of the intermediate tank 175A and the ink channel section 177A is in communication with the auxiliary storage chamber 179A. The downstream end of the ink channel section 177A is connected to a print head (not illustrated) of the printing mechanism 171A. With this configuration, ink Ik in the auxiliary storage chamber 179A is supplied to the printing mechanism 171A through the ink channel section 177A.

As is clear from the above description, the intermediate tank 175A is disposed along the path of ink Ik flowing from the ink cartridge 200 mounted in the mounting portion 172A to the printing mechanism 171A.

This type of ink supply system that provides an intermediate tank along the flow path of the ink Ik leading from the ink cartridge to the printing mechanism, as in the print executing unit 170A, will be called a double-chamber supply system. FIG. 8A depicts the print executing unit 170A in a first storage state S1, while FIG. 8B depicts the print executing unit 170A in a second storage state S2. In the first storage state S1, ink Ik remains in the ink cartridge 200 (the main storage chamber 210) and in the intermediate tank 175A (the auxiliary storage chamber 179A). In the second storage state S2, ink Ik remains in the intermediate tank 175A (the auxiliary storage chamber 179A), but no longer remains in the ink cartridge 200 (the main storage chamber 210).

The main storage chamber 210 in the ink cartridge 200 communicates with the atmosphere through the air hole 220, while the auxiliary storage chamber 179A in the intermediate tank 175A communicates with the atmosphere through the air hole 178A. The auxiliary storage chamber 179A of the intermediate tank 175A includes a section positioned lower (below in FIGS. 8A and 8B) than the bottom of the main storage chamber 210 (the lower end of the main storage chamber 210 in the vertical direction) formed in the ink cartridge 200, and a section positioned higher than the bottom of the main storage chamber 210 in the vertical direction. Thus, when a new ink cartridge 200 is mounted in the mounting portion 172A, some of the ink Ik in the ink cartridge 200 transfers from the main storage chamber 210 into the auxiliary storage chamber 179A through the ink supply opening 174A. Consequently, the level ISm of ink Ik in the main storage chamber 210 and the level ISs of ink Ik in the auxiliary storage chamber 179A are adjusted to the same height (see FIG. 8A).

As ink Ik is consumed through printing by the printing mechanism 171A, the levels ISm and ISs drop while remaining at the same level as each other. Once the levels ISm and ISs reach a vertical position EL corresponding to the bottom of the main storage chamber 210 (hereinafter called an "empty level EL," which corresponds to the second empty level EL in the first embodiment illustrated in FIGS. 2A and 2B), ink Ik no longer remains in the main storage chamber 210. Hence, the storage state of ink Ik shifts from the first storage state S1 illustrated in FIG. 8A to the second storage state S2 illustrated in FIG. 8B. Here, the state in which ink Ik no longer remains in the main storage chamber 210 of the ink cartridge 200 signifies that ink Ik no longer transfers from the main storage chamber 210 into the auxiliary storage chamber 179A and includes a state in which some ink Ik remains deposited on the inner walls of the main storage chamber 210.

The printing mechanism 171A can continue to execute printing operations even after the storage state of ink Ik has shifted to the second storage state S2, provided that ink Ik remains in the auxiliary storage chamber 179A. Therefore, the ink cartridge 200 can be replaced without wasting ink Ik at any time after the storage state of ink Ik has shifted to the second storage state S2. This aspect that allows the ink cartridge 200 to be replaced while printing is still possible, without wasting any ink Ik, is an advantage of the double-chamber supply system.

The ink volume corresponding to the boundary between the first storage state S1 and second storage state S2 will be called a boundary ink volume BV. The boundary ink volume BV in the present embodiment may be considered the volume of ink Ik in the auxiliary storage chamber 179A when the level ISs in the auxiliary storage chamber 179A has dropped to the empty level EL. The boundary ink volume BV may also be considered the maximum ink volume in the second storage state S2. Further, the boundary ink volume BV is equivalent to the capacity of the section of the auxiliary storage chamber 179A positioned below the bottom of the main storage chamber 210.

Here, the ratio (in units of % in the present embodiment) of the boundary ink volume BV to the initial ink volume IV of the ink cartridge 200 will be called a boundary residual ink percentage BR (BR=(BV/IV)×100). In the present embodiment, the initial ink volume IV is set to denote the initial fill quantity of ink Ik stored in the ink cartridge 200.

The boundary residual ink percentage BR may be thought of as the residual ink percentage IR corresponding to the boundary ink volume BV. The boundary residual ink percentage BR will be used in the order target setting process described later. The printer 100 may calculate the boundary residual ink percentage BR and may transmit the result to the management server 300 as part of the ink information. Alternatively, the printer 100 may transmit the initial ink volume IV and boundary ink volume BV to the management server 300 and the management server 300 may calculate the boundary residual ink percentage BR using the initial ink volume IV and boundary ink volume BV.

In the present embodiment, each time the used ink cartridge 200 is replaced with a new ink cartridge 200, the printer 100 records the initial ink volume of the corresponding ink Ik in the printer 100 and in the new ink cartridge 200 just mounted in the printer 100 as the residual ink volume RV of the corresponding ink Ik. Here, the initial ink volume of ink Ik in the printer 100 denotes the residual quantity of ink Ik in the auxiliary storage chamber 179A of the intermediate tank 175A remained at the moment the used ink cartridge 200 is detached from the mounted portion 172A. In other words, the residual ink volume RV of ink Ik at the moment the used ink cartridge 200 is replaced with the new cartridge 200 is calculated by adding a previous final residual ink volume FRV of the auxiliary storage chamber 179A of the intermediate tank 175A to the initial ink volume IV of the new ink cartridge 200. The previous final residual ink volume FRV is calculated from the previous final residual ink percentage FR, for example, and a default of zero is used as the previous final residual ink volume FRV when the new ink cartridge 200 is the first ink cartridge 200 used in the printer 100.

Each time a printing operation is executed, as in the first embodiment, the printer 100 calculates the residual ink volume RV after execution of the printing operation by calculating the consumed quantity of ink Ik during the printing operation and subtracting this quantity from the residual ink volume RV prior to execution of the printing operation. The printer 100 further calculates the residual ink percentage IR by dividing the residual ink volume RV by the initial ink volume IV of the ink cartridge 200 currently mounted in the printer 100. Since the initial ink volume IV does not include the final residual ink volume FRV in the printer 100, the value of the residual ink percentage IR exceeds 100% at the moment the used ink cartridge 200 is replaced with the new ink cartridge 200 in general, but decreases as the printing operation is executed.

B-2. Management Process

In the management process according to the second embodiment, the method of setting the order level in S150 and the order target setting process of S155 differ from the management process according to the first embodiment (see FIG. 5). The remainder of the process in the second embodiment is identical to that in the first embodiment. In the second embodiment, the management server 300 sets the order level to "high" when the previous final residual ink percentage FR is less than or equal to the boundary residual percentage BR and sets the order level to "low" when the previous final residual ink percentage FR is greater than the boundary residual percentage BR.

Figure 9:
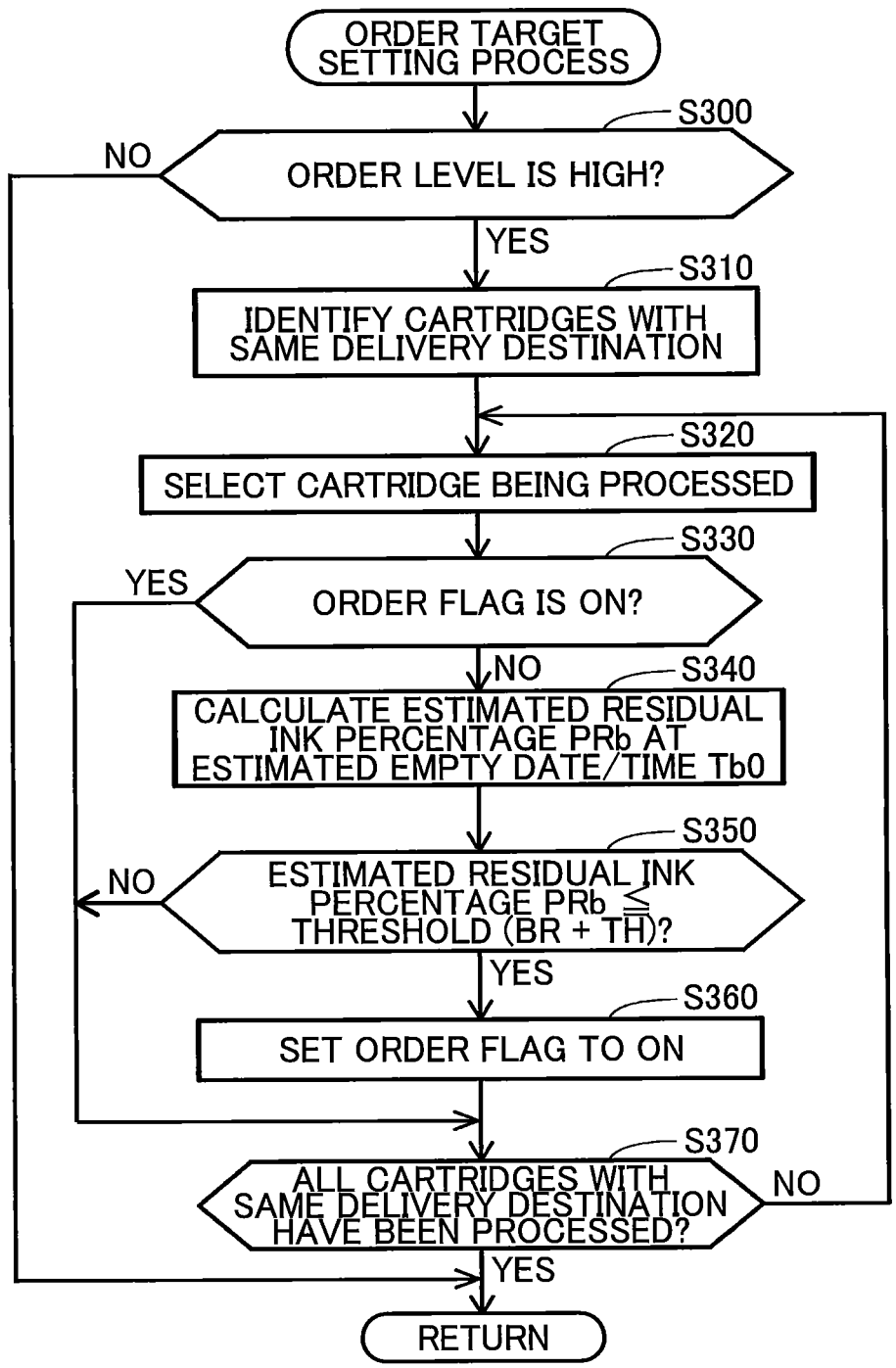
FIG. 9 is a flowchart illustrating steps in an order target setting process executed by a management server constituting the system according to the second embodiment.
Figure 10:
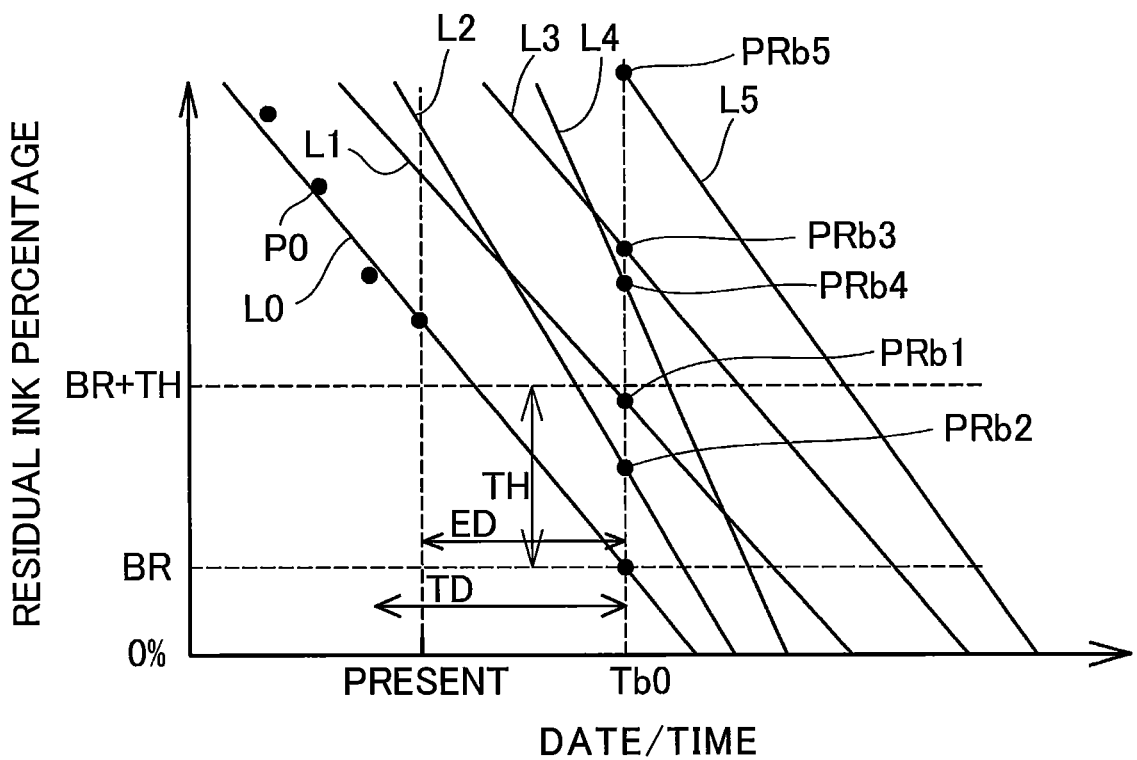
FIG. 10 is a graph illustrating a relationship between residual ink percentage and date/time according to the second embodiment.

FIG. 9 is a flowchart illustrating steps in the order target setting process according to the second embodiment. FIG. 10 is a graph illustrating the relationship between the residual ink percentage IR (vertical axis) and the date/time (horizontal axis) according to the second embodiment.

In S300 of FIG. 9, the management server 300 determines whether the order level set in S150 of FIG. 5 is "high." If the order level is "low" (S300: NO), the management server 300 ends the order target setting process. However, if the order level is "high" (S300: YES), in S310 the management server 300 identifies one or more cartridges having the same delivery destination as that of the target cartridge, as described in S200 of FIG. 7. As in the first embodiment, this description will assume that five ink cartridges 200 are identified in this step.

In S320 the management server 300 selects one of the five ink cartridges 200 with the same delivery destination as that of the target cartridge as an ink cartridge 200 being processed. In S330 the management server 300 determines whether the order flag corresponding to the ink cartridge 200 being processed is set to "ON." If the order flag for the ink cartridge 200 being processed is set to "ON" (S330: YES), the management server 300 advances to S370.

However, if the order flag corresponding to the ink cartridge 200 being processed is set to "OFF" (S330: NO), in S340 the management server 300 calculates an estimated value of the residual ink percentage IR (an estimated residual ink percentage PRb) for the ink cartridge 200 being processed at an estimated empty date/time Tb0 for the target cartridge. As described above, ink Ik in the ink cartridge 200 reaches the empty state (the second storage state S2 in FIG. 8B) when the level ISs of ink Ik drops to the empty level EL in the double-chamber supply system according to the second embodiment. Therefore, in S135 of FIG. 5 the estimated empty date/time Tb0 for the target cartridge according to the second embodiment is calculated according to the approximation line L0 to be the date/time on which the residual ink percentage IR reaches the boundary residual ink percentage BR, as illustrated in FIG. 10. The management server 300 sets an approximation line (approximation lines L1 to L5 in FIG. 10, for example) indicating the transition of the residual ink percentage IR over time based on the plurality of residual ink percentages IR acquired to the present for the ink cartridge 200 being processed. The management server 300 calculates the estimated residual ink percentage PRb for the ink cartridge 200 being processed at the estimated empty date/time Tb0 for the target cartridge according to this approximation line. FIG. 10 illustrates approximation lines L1 to L5 indicating the transition of residual ink percentage IR for each of the five ink cartridges 200 having the same delivery destination as that of the target cartridge, and their corresponding estimated residual ink percentages PRb1 to PRb5 at the estimated empty date/time Tb0 for the target cartridge.

In S350 the management server 300 determines whether the estimated residual ink percentage PRb calculated in S340 is less than or equal to a threshold (BR+TH). The threshold (BR+TH) is the sum of the boundary residual ink percentage BR and a specific threshold TH. Since the boundary residual ink percentage BR is the estimated residual ink percentage PRb for the target cartridge at the estimated empty date/time Tb0, the determination in S350 may be thought of as determining whether the difference at the estimated empty date/time Tb0 for the target cartridge in estimated residual ink percentage PRb between the ink cartridge 200 being processed and the target cartridge is less than or equal to the specific threshold TH.

If the estimated residual ink percentage PRb is less than or equal to the threshold (BR+TH) (S350: YES), in S360 the management server 300 sets the order flag for the ink cartridge 200 being processed to "ON." In the example of FIG. 10, the estimated residual ink percentages PRb1 and PRb2 are less than or equal to the threshold (BR+TH). Accordingly, when the ink cartridge 200 being processed is one of the ink cartridges 200 corresponding to the estimated residual ink percentage PRb1 or estimated residual ink percentage PRb2, the corresponding flag is set to "ON."

If the estimated residual ink percentage PRb is greater than the threshold (BR+TH) (S350: NO), the management server 300 skips S360 and advances to S370.

In S370 the management server 300 determines whether all of the ink cartridges 200 having the same delivery destination as that of the target cartridge have been processed. If there remain unprocessed ink cartridges 200 (S370: NO), the management server 300 returns to S320 and selects one of the unprocessed ink cartridges 200 to be the ink cartridge 200 being processed. When all ink cartridges 200 having the same delivery destination as that of the target cartridge have been processed (S370: YES), the management server 300 ends the order target setting process.

According to the second embodiment described above, the order target setting process ends when the order level is set to "low" (S300: NO). Hence, the management server 300 sets only the target cartridge as an ink cartridge 200 to be replaced (a replacement target ink cartridge 200) when the order level is "low" in the second embodiment, and the ink cartridges 200 having the same delivery destination as that of the target cartridge are not set as ink cartridges 200 to be replaced (replacement target ink cartridges 200). This method can suppress wastage of ink Ik by ordering replacement ink cartridges 200 one at a time when the order level is "low."

Further, since the estimated empty date/time Tb0 for the target cartridge is calculated to be the date/time on which the residual ink percentage IR of the target cartridge reaches the boundary residual ink percentage BR in the second embodiment, the date/time on which the ink cartridge 200 reaches an empty state (the second storage state S2 in FIG. 8B) can be more accurately calculated for printers utilizing a double-chamber supply system.

According to the second embodiment, when the estimated residual ink percentage PRb for an ink cartridge 200 having the same delivery destination as that of the target cartridge is less than or equal to the threshold (BR+TH), which is greater than the boundary residual ink percentage BR, the ink cartridge 200 corresponding to the estimated residual ink percentage PRb is set as an ink cartridge 200 to be replaced (a replacement target ink cartridge 200). This method can set replacement target ink cartridges more suitably for a printer employing a double-chamber supply system when the order level is "high."

C. Third Embodiment

Figure 11:
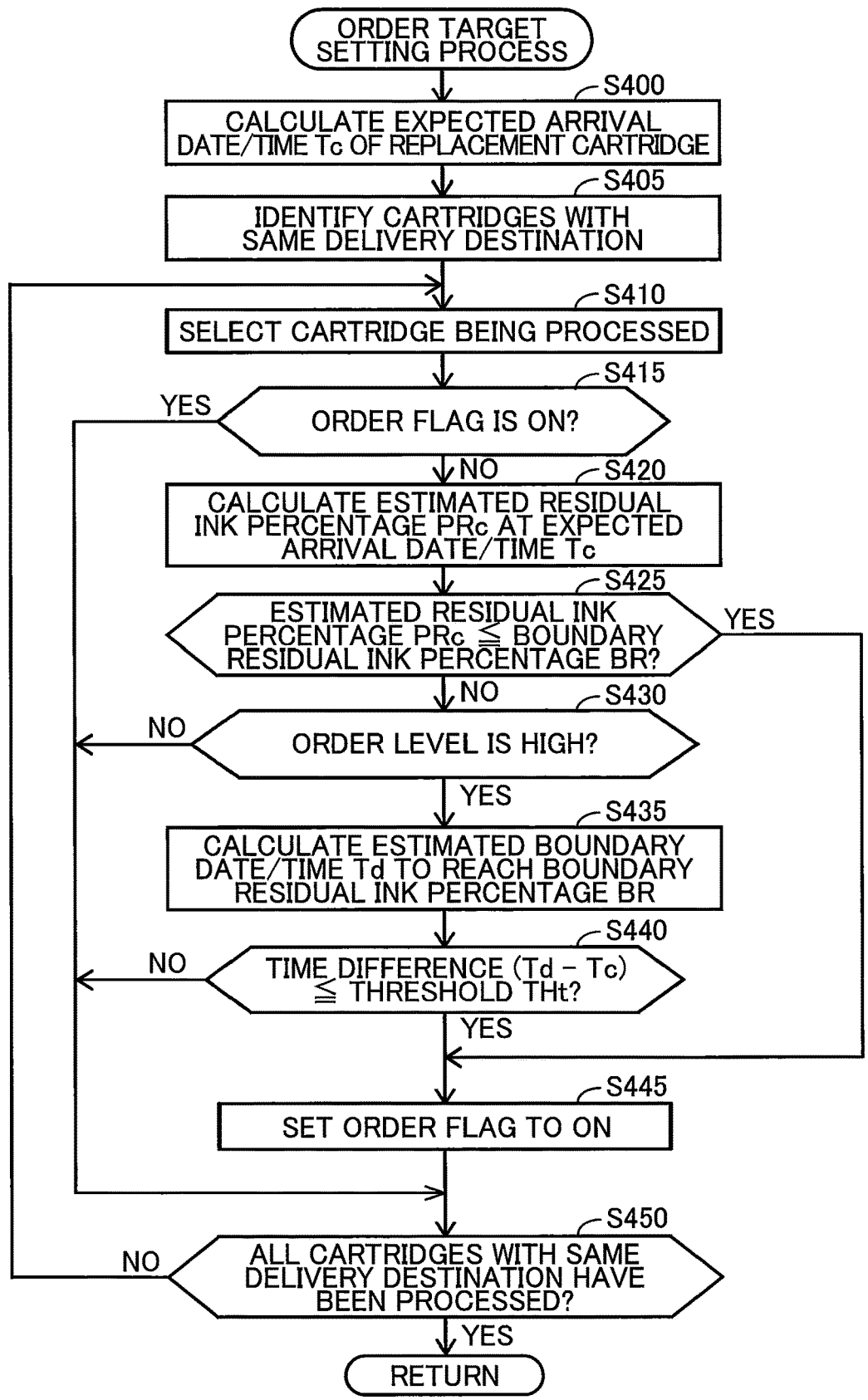
FIG. 11 is a flowchart illustrating steps in an order target setting process executed by a management server constituting a system according to a third embodiment.
Figure 12:
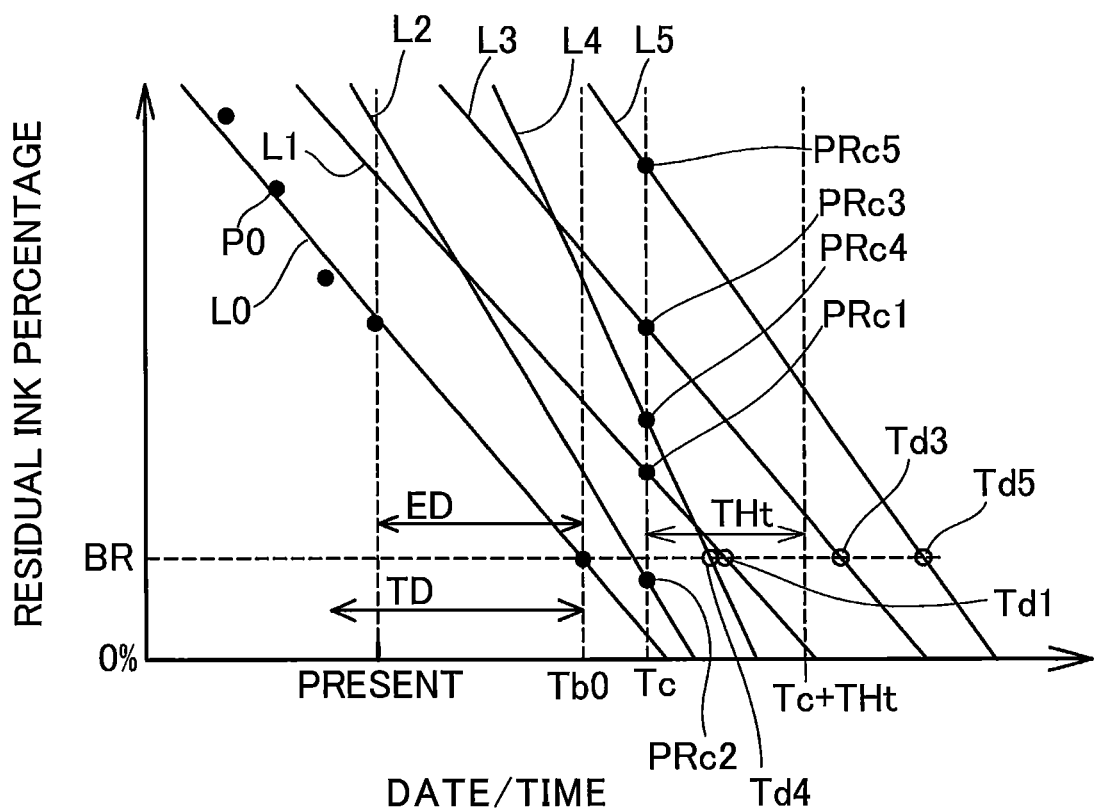
FIG. 12 is a graph illustrating a relationship between residual ink percentage and date/time according to the third embodiment.

As in the second embodiment, the printers under management in the third embodiment employ a double-chamber supply system (see FIGS. 8A and 8B). The third embodiment differs from the second embodiment in the order target setting process. All other processes in the third embodiment are identical to those in the second embodiment. FIG. 11 is a flowchart illustrating steps in the order target setting process according to the third embodiment. FIG. 12 is a graph illustrating the relationship between the residual ink percentage IR (vertical axis) and the date/time (horizontal axis) according to the third embodiment.

In S400 of FIG. 11, the management server 300 calculates an expected arrival date/time Tc of a replacement ink cartridge 200 for replacement with the target cartridge. The expected arrival date/time Tc is the date/time following the present date/time by the prescribed number of days required for delivering the replacement ink cartridge 200.

In S405 the management server 300 identifies one or more cartridges having the same delivery destination as that of the target cartridge, as in S200 of FIG. 7. As in the first embodiment, the following description will assume that five ink cartridges 200 are identified in this step.

In S410 the management server 300 selects one of the five ink cartridges 200 having the same delivery destination as that of the target cartridge as the ink cartridge 200 being processed. In S415 the management server 300 determines whether the order flag corresponding to the ink cartridge 200 being processed is "ON." If the order flag for the ink cartridge 200 being processed is "ON" (S415: YES), the management server 300 advances to S450.

However, if the order flag for the ink cartridge 200 being processed is "OFF" (S415: NO), in S420 the management server 300 calculates an estimated value of the residual ink percentage IR (an estimated residual ink percentage PRc) for the ink cartridge 200 being processed at the expected arrival date/time Tc calculated for the target cartridge in S400. Specifically, the management server 300 sets an approximation line (such as one of the approximation lines L1 to L5 in FIG. 12) indicating the transition of the residual ink percentage IR over time on the basis of the plurality of residual ink percentages IR acquired to the present for the ink cartridge 200 being processed. The management server 300 calculates the estimated residual ink percentage PRc at the expected arrival date/time Tc of the replacement ink cartridge 200 for replacement with the target cartridge according to this approximation line. FIG. 12 illustrates approximation lines L1 to L5 indicating the transition of the residual ink percentage IR, and estimated residual ink percentages PRc1 to PRc5 at the expected arrival date/time Tc for each of the five ink cartridges 200 having the same delivery destination as that of the target cartridge.

In S425 the management server 300 determines whether the estimated residual ink percentage PRc for the ink cartridge 200 being processed is less than or equal to the boundary residual ink percentage BR. If the estimated residual ink percentage PRc is less than or equal to the boundary residual ink percentage BR, the ink cartridge 200 being processed is expected to become empty (reach its empty state corresponding to the second storage state S2 in FIG. 8B) when the replacement ink cartridge 200 for replacement with the target cartridge reaches the user. Consequently, it is preferable in this case to order a replacement ink cartridge 200 for replacement with the ink cartridge 200 being processed together with the replacement ink cartridge 200 for replacement with the target cartridge, even if the order level is "low." Therefore, when the estimated residual ink percentage PRc is less than or equal to the boundary residual ink percentage BR (S425: YES), in S445 the management server 300 sets the order flag corresponding to the ink cartridge 200 to be replaced (the replacement target ink cartridge 200) to "ON," irrespective of the order level. This method can appropriately set ink cartridges 200 to be replaced (replacement target ink cartridges 200) in printers employing a double-chamber supply system, even when the order level is "low." In the example of FIG. 12, the estimated residual ink percentage PRc2 is less than or equal to the boundary residual ink percentage BR, while the other estimated residual ink percentages PRc1 and PRc3 to PRc5 are greater than the boundary residual ink percentage BR. Therefore, when the ink cartridge 200 corresponding to the estimated residual ink percentage PRc2 is the ink cartridge 200 being processed, the corresponding order flag is set to "ON."

However, if the estimated residual ink percentage PRc is greater than the boundary residual ink percentage BR (S425: NO), in S430 the management server 300 determines whether the order level set in S150 of FIG. 5 is "high." If the order level is "low" (S430: NO), the management server 300 advances to S450.

However, if the order level is "high" (S430: YES), in S435 the management server 300 calculates an estimated value for the date/time at which the residual ink percentage IR for the ink cartridge 200 being processed reaches the boundary residual ink percentage BR (hereinafter also called the "estimated boundary date/time Td"). The estimated boundary date/time Td can be considered the expected date/time at which the ink cartridge 200 being processed becomes empty. FIG. 12 illustrates estimated boundary dates/times Td1 and Td3 to Td5 for the ink cartridges 200 having the same delivery destination as that of the target cartridge and that correspond to the approximation lines L1 and L3 to L5.

In S440 the management server 300 determines whether the difference between the estimated boundary date/time Td calculated in S435 and the expected arrival date/time Tc of the replacement ink cartridge 200 for replacement with the target cartridge (Td-Tc) is less than or equal to a specific threshold THt. In other words, the management server 300 determines whether the estimated boundary date/time Td is earlier than the date/time (Tc+THt).

If the difference (Td-Tc) is less than or equal to the threshold THt (S440: YES), in S445 the management server 300 sets the order flag corresponding to the ink cartridge 200 being processed to "ON." In the example of FIG. 12, both the estimated boundary dates/times Td1 and Td4 have a difference with the expected arrival date/time Tc that is less than or equal to the threshold THt. Therefore, when the ink cartridge 200 being processed is one of the ink cartridges 200 corresponding to the estimated boundary date/time Td1 or Td4, the corresponding flag is set to "ON."

If the difference (Td-Tc) is greater than the threshold THt (S440: NO), the management server 300 skips S445 and advances to S450.

In S450 the management server 300 determines whether all ink cartridges 200 having the same delivery destination as that of the target cartridge have been processed. If there remain unprocessed ink cartridges 200 (S450: NO), the management server 300 returns to S410 and selects one of the unprocessed ink cartridges 200 to be the ink cartridge 200 being processed. When all ink cartridges 200 having the same delivery destination as that of the target cartridge have been processed (S450: YES), the management server 300 ends the order target setting process.

Using the example of FIG. 12, two ink cartridges 200, and specifically the ink cartridge 200 corresponding to the estimated residual ink percentage PRc2 and the target cartridge, are set as ink cartridges 200 to be replaced (replacement target ink cartridges 200) when the order level is "low" according to the third embodiment described above. When the order level is "high," four cartridges, specifically the ink cartridge 200 corresponding to the estimated residual ink percentage PRc2, two ink cartridges 200 corresponding to the estimated boundary dates/times Td1 and Td4, and the target cartridge, are set as ink cartridges 200 to be replaced (replacement target ink cartridges 200).

In the order target setting process of FIG. 11 according to the third embodiment described above, the estimated residual ink percentage PRc and the difference between the estimated boundary date/time Td and the expected arrival date/time Tc (Td-Tc) are both used as index values based on information related to the residual quantity of ink Ik (the residual ink percentage IR in the present embodiment). When the order level is "low" (S430: NO), the management server 300 sets, from among ink cartridges 200 having the same delivery destination as that of the target cartridge, those ink cartridges 200 whose estimated residual ink percentage PRc is less than or equal to the boundary residual ink percentage BR as ink cartridges 200 to be replaced (a replacement target ink cartridges 200) (S445). When the order level is "high" (S430: YES), the management server 300 sets, from among ink cartridges 200 having the same delivery destination as that of the target cartridge, ink cartridges 200 whose estimated residual ink percentage PRc is less than or equal to the boundary residual ink percentage BR and ink cartridges 200 whose difference (Td-Tc) is less than or equal to the threshold THt as ink cartridges 200 to be replaced (replacement target ink cartridges 200) (S445). In this way, two types of index values can be used for suitably setting replacement target ink cartridges 200.

D. Variations of the Embodiments (1) In the embodiments described above, when the order level is "high," a timing at which an ink cartridge 200 having the same delivery destination as that of the target cartridge and which is set as a replacement target ink cartridge 200 satisfies the order condition is closer to a timing at which the target cartridge satisfies the order condition than a timing at which an ink cartridge 200 having the same delivery destination as that of the target cartridge and which is other than those set as the replacement target ink cartridges 200 (ink cartridges 200 not to be replaced) is. In the order target setting process of the embodiments described above, a condition capable of appropriately setting such ink cartridges 200 as replacement target ink cartridges 200 is used for determining whether each ink cartridge 200 being processed is a replacement target ink cartridge 200 (i.e., whether the order flag is set to "ON"). This method can reduce the chance of an ink cartridge 200 being replaced too early due to the replacement ink cartridge 200 reaching the user too soon and, hence, can reduce the problem of excessive ink Ik wastage caused by ink cartridges 200 being replaced too early. In the first and third embodiments, the replacement target ink cartridges 200 are set in the same manner when the order level is "high."

However, there are many conceivable variations for the condition used for appropriately setting whether such ink cartridges 200 are replacement target ink cartridges 200. FIGS. 13 and 14 are graphs illustrating the relationship between the residual ink percentage IR (vertical axis) and the date/time (horizontal axis) according to a variation of the embodiments.

Figure 13A:
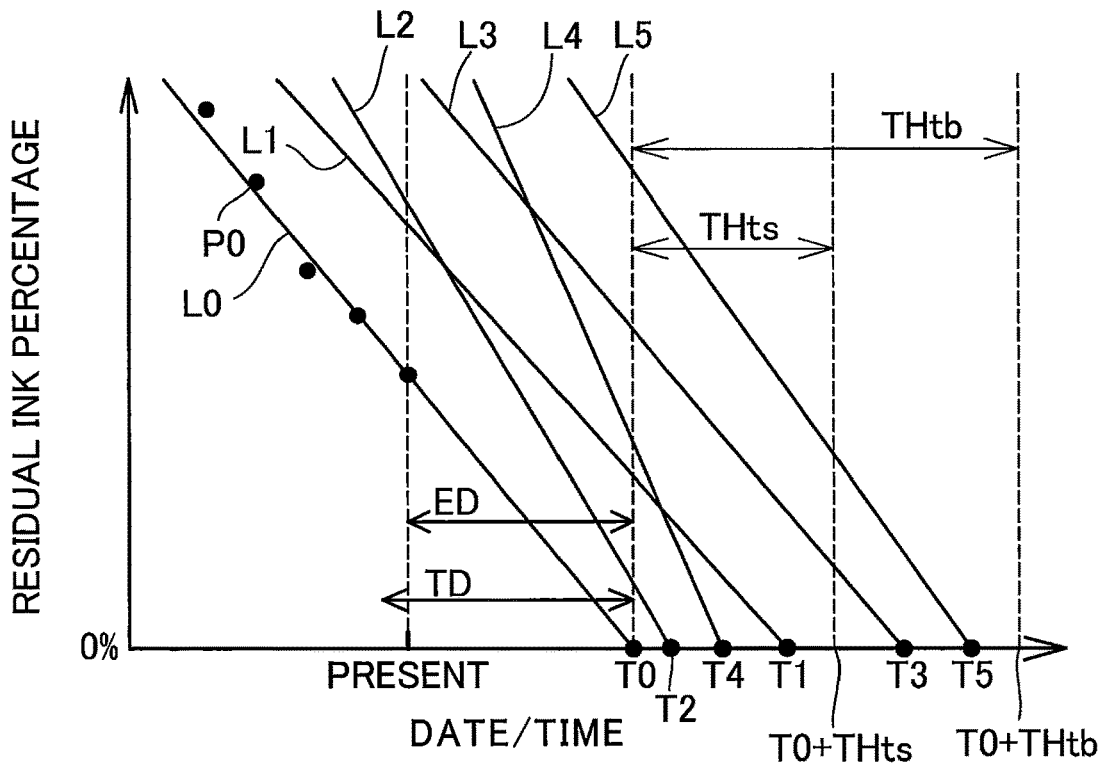
FIG. 13A is a graph illustrating a relationship between residual ink percentage and date/time according to a variation of the embodiments.
Figure 14:
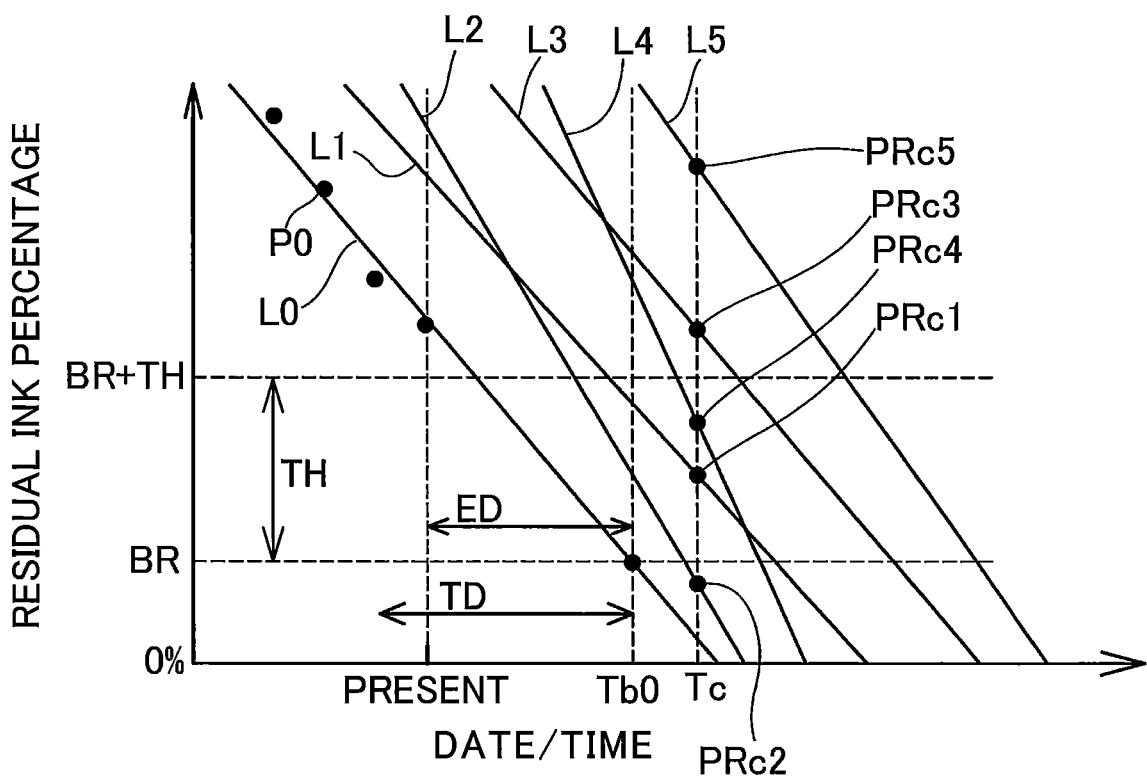
FIG. 14 is a graph illustrating a relationship between residual ink percentage and date/time according to still another variation of the embodiments.

In the variation of FIG. 13A, the management server 300 uses the ink history information in S215 of the order target setting process of FIG. 7 described in the first embodiment to calculate an estimated empty date/time at which the residual ink percentage IR for the ink cartridge 200 being processed reaches 0%. FIG. 13A illustrates approximation lines L1 to L5 indicating the transition of the residual ink percentage IR, and estimated empty dates/times T1 to T5 at which the residual ink percentage IR becomes 0% for each of five ink cartridges 200 having the same delivery destination as that of the target cartridge. In S230 of the order target setting process, the management server 300 determines whether the difference between the estimated empty date/time for the ink cartridge 200 being processed and the estimated empty date/time T0 for the target cartridge (e.g., T1−T0) is less than or equal to a small threshold THts. In S225 the management server 300 determines whether the difference between the estimated empty date/time for the ink cartridge 200 being processed and the estimated empty date/time T0 for the target cartridge is less than or equal to a large threshold THtb.

In the variation of FIG. 13A, in the order target setting process according to this variation the management server 300 sets, as target replacement ink cartridges 200, the three ink cartridges 200 that respectively correspond to the estimated empty dates/times T1, T2, and T4 from among the five ink cartridges 200 having the same delivery destination as that of the target cartridge when the order level is "low." When the order level is "high," all five ink cartridges 200 having the same delivery destination as that of the target cartridge are set as target replacement ink cartridges 200. In this variation, the difference between the estimated empty date/time for the ink cartridge 200 being processed and the estimated empty date/time T0 for the target cartridge is used as the index value.

Figure 13B:
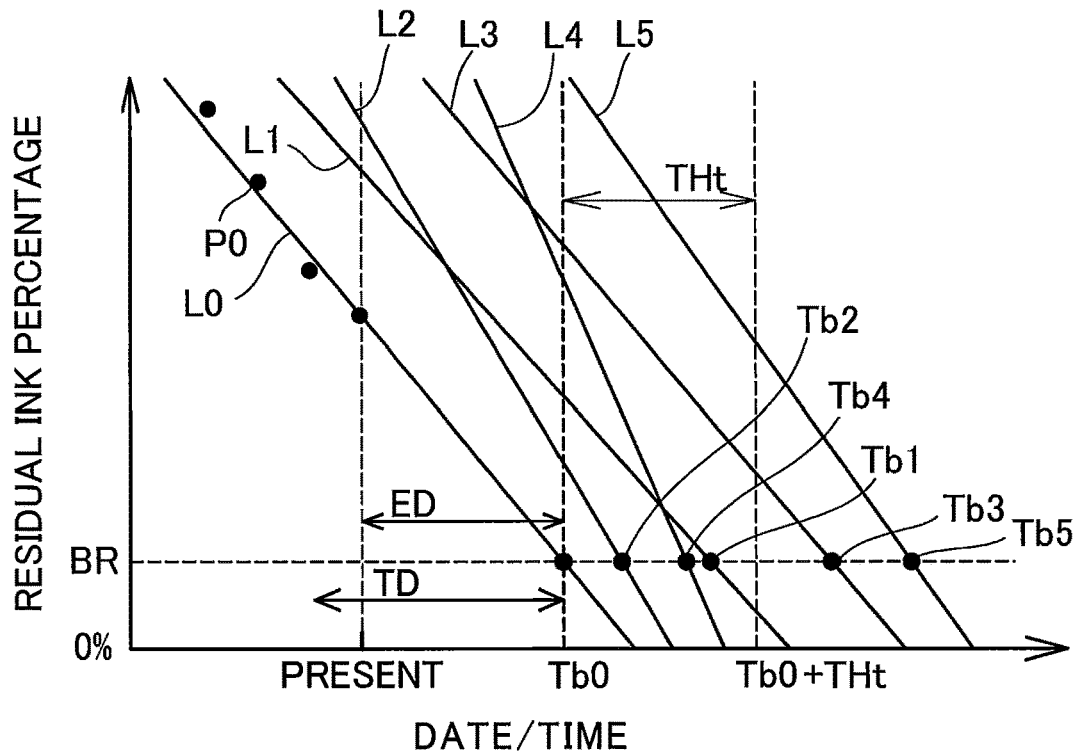
FIG. 13B is a graph illustrating a relationship between residual ink percentage and date/time according to another variation of the embodiments.

According to the variation of FIG. 13B, in S340 of the order target setting process in FIG. 9 according to the second embodiment the management server 300 uses the ink history information to calculate an estimated empty date/time at which the residual ink percentage IR of the ink cartridge 200 being processed reaches the boundary residual ink percentage BR. FIG. 13B illustrates approximation lines L1 to L5 indicating the transition of the residual ink percentage IR, and estimated empty dates/times Tb1 to Tb5 at which the residual ink percentage IR becomes the boundary residual ink percentage BR for each of five ink cartridges 200 having the same delivery destination as that of the target cartridge. In S350 of FIG. 9, the management server 300 determines whether the difference between the estimated empty date/time for the ink cartridge 200 being processed and the estimated empty date/time Tb0 for the target cartridge (e.g., Tb1−Tb0) is less than or equal to the threshold THt.

In the variation of FIG. 13B, in the order target setting process of this variation the management server 300 sets, as replacement target ink cartridges 200, the three ink cartridges 200 that correspond to the estimated empty dates/times Tb1, Tb2, and Tb4 from among the five ink cartridges 200 having the same delivery destination as that of the target cartridge when the order level is "high." In this variation, the difference between the estimated empty date/time for the ink cartridge 200 being processed and the estimated empty date/time Tb0 for the target cartridge is used as the index value.

In the variation of FIG. 14, step S435 is not executed in the order target setting process of FIG. 11 according to the third embodiment. In S440 the management server 300 determines whether the estimated residual percentage PRc calculated in S420 for the ink cartridge 200 being processed is less than or equal to a threshold (BR+TH) greater than the boundary residual ink percentage BR by the threshold TH.

In the variation of FIG. 14, the management server 300 sets, as a replacement target ink cartridge 200, the single ink cartridge 200 corresponding to the estimated residual percentage PRc2 from among the five ink cartridges 200 having the same delivery destination as that of the target cartridge when the order level is "low." When the order level is "high," the management server 300 sets, as replacement target ink cartridges 200, the three ink cartridges 200 having the same delivery destination as that of the target cartridge and that correspond to the estimated residual percentages PRc1, PRc2, and PRc4. In this variation, the estimated residual percentage PRc for the ink cartridge 200 being processed is used as the index value. According to this variation, a threshold greater than the boundary residual ink percentage BR, i.e., (BR+TH), can be used to suitably set replacement target ink cartridges 200 in a printer employing a double-chamber supply system when the order level is "high."

(2) In the embodiments and their variations described above, replacement target ink cartridges 200 are set using some type of threshold value. However, as another variation, replacement target ink cartridges 200 may be set without using any threshold values. For example, in the first embodiment a prescribed number of ink cartridges 200 among the plurality of ink cartridges 200 having the same delivery destination as that of the target cartridge may be set as replacement target ink cartridges 200 in order of smallest estimated residual ink percentage PR at the estimated empty date/time T0 for the target cartridge. For example, (M−1) number (where M is an integer equal to or greater than one) of ink cartridges 200 may be set as replacement target ink cartridges 200 in order of the smallest estimated residual ink percentage PR when the order level is "low," and (N−1) number (where N is an integer satisfying the expression N≥M) of ink cartridges 200 may be set as replacement target ink cartridges 200 in order of the smallest estimated residual ink percentage PR when the order level is "high."

(3) In the first embodiment described above, the management server 300 determines whether an ink cartridge 200 being processed should be set as a replacement target ink cartridge 200 based on whether the estimated residual ink percentage for the ink cartridge 200 being processed at the estimated empty date/time T0 for the target cartridge is less than or equal to a threshold THb or THs. However, replacement target ink cartridges 200 may be determined on the basis of the estimated residual ink percentage PR or residual ink percentage IR of the ink cartridge 200 being processed at a timing different from the estimated empty date/time T0 of the target cartridge. For example, the management server 300 may determine whether the ink cartridge 200 being processed should be set as a replacement target ink cartridge 200 based on whether the difference between the current residual ink percentage IR of the ink cartridge 200 being processed and the current residual ink percentage IR of the target cartridge is less than or equal to the threshold THb or THs. Similarly, the management server 300 may determine replacement target ink cartridges 200 in the second embodiment on the basis of the estimated residual ink percentage or the residual ink percentage IR of the ink cartridge 200 being processed on a date/time different from the estimated empty date/time Tb0 of the target cartridge, rather the estimated residual ink percentage PRb of the ink cartridge 200 being processed at the estimated empty date/time Tb0 of the target cartridge.

(4) In S150 of the management process in FIG. 5 according to the embodiments described above, the management server 300 sets the order level based on the previous final residual ink percentage FR of the target cartridge. However, the present disclosure is not limited to this method, provided that the order level is set on the basis of at least one of the previous final residual ink percentage FR for the target cartridge and the previous final residual ink percentage FR for an ink cartridge 200 having the same delivery destination as that of the target cartridge. For example, the management server 300 may set the order level to "high" when the average value of the previous final residual ink percentage FR for the target cartridge and previous final residual ink percentages FR for the five ink cartridges 200 having the same delivery destination as that of the target cartridge is less than or equal to a prescribed threshold (5%, for example) and may set the order level to "low" when the average value is greater than the prescribed threshold. Alternatively, the management server 300 may set the order level to "high" when the percentage of ink cartridges 200 having a previous final residual ink percentage FR of 0% is greater than or equal to a prescribed threshold (80%, for example) and may set the order level to "low" when the percentage is less than the prescribed threshold.

Further, the present disclosure is not limited to the previous final residual ink percentage FR for determining the order level. The order level may be set on the basis of the residual quantity of ink Ik in a used ink cartridge 200 that was used two or more cartridges prior to the current in-use ink cartridge 200 at the timing that the used ink cartridge 200 was replaced. Alternatively, the order level may be set in the order target setting process for each ink cartridge 200 being processed on the basis of the previous final residual ink percentage FR of the ink cartridge 200 being processed. Alternatively, an order level may be set for each printer 100 on the basis of the previous final residual ink percentages FR for all CMYK ink cartridges 200 mounted in the printer 100.

In general, it is preferable, according to residual quantity information related to the residual quantity of ink Ik in one or more used ink cartridges 200 at the time of their replacement, to set the order level to "high" when the residual quantity of ink Ik in the one or more used ink cartridges 200 at the time of replacement is less than or equal to a reference, and to set the order level to "low" when the residual quantity of ink Ik in the one or more used ink cartridges 200 at the time of replacement is greater than the reference.

(5) In the embodiments described above, the residual ink percentage IR is used as the ink history information recorded in the management database PD that is related to the residual quantity of ink Ik. However, the residual ink volume RV directly indicating the residual quantity of ink Ik or the remaining printing days RD may be used as the ink history information. The remaining printing days RD is a number specifying a period of days commensurate with the residual quantity of ink Ik (or the residual ink percentage IR), and specifically specifies the period in which printing will be possible without replacing the ink cartridge 200. The remaining printing days RD may be considered a value specifying the residual quantity of ink Ik in units of days.

Note that when the residual ink volume RV is used to directly specify the residual quantity of ink Ik, ink cartridges 200 with the same delivery destination may have different capacities. For example, the capacities of ink cartridges 200 accommodating C, M, and Y ink Ik are sometimes smaller than the capacity of the ink cartridge 200 accommodating K ink Ik. In this case, it is preferable to use different threshold values in the order target setting process in accordance with the capacity of the ink cartridge 200 when comparing the threshold value to an index value based on the residual ink volume RV of each ink cartridge 200, such as an estimated residual ink volume PV at the estimated empty date/time T0 of the target cartridge. For example, a smaller threshold value is preferably used for a smaller capacity of the ink cartridge 200.

(6) In the embodiments described above, the order level is set to one of only two levels, "low" and "high." However, the number of possible order levels may be three or more. For example, the order level may be set to an increasingly higher level for increasingly lower residual quantities of ink Ik at the timing that the used ink cartridge 200 was replaced. In this case, replacement target ink cartridges 200 are preferably set to an increasingly larger number for increasingly higher order levels, for example.

(7) In the embodiments described above, the printers under management are provided with a printing mechanism that prints color images using ink Ik in the colors C, M, Y, and K. However, all or some of the printers under management may be provided with a printing mechanism that prints monochrome images using a single ink color (black (K), for example).

(8) In the embodiments described above, the printers under management are provided with an inkjet-type printing mechanism. However, the printers under management may instead be provided with a printing mechanism employing an electrophotographic system (laser system, for example) for printing images using toner as the printing agent. In this case, the print executing unit may be provided with a mounting portion in which a toner cartridge is mountable, a printing mechanism that executes printing operations using the toner accommodated in the toner cartridge mounted in the mounting portion, and a tank (a sub tank for temporarily storing toner, for example) disposed along the path that toner travels from the toner cartridge mounted in the mounting portion to the printing mechanism. The present disclosure may be applied to this type of printer provided with a double-chamber supply system for supplying toner. Alternatively, the present disclosure may be applied to a printer provided with a single-chamber supply system for supplying toner that does not include a tank disposed along the path that toner travels from the toner cartridge mounted in the mounting portion to the printing mechanism.

(9) While the management server 300 is connected to the internet IT in the embodiments described above, the management server 300 may be connected to the local area network NT instead. In this case, the management server 300 may acquire ink information and other printer information from the plurality of printers 100 under management using the Simple Network Management Protocol (SNMP).

Further, the management server 300 may be a cloud server, for example, that includes a plurality of computers capable of communicating with each other over a network.

(10) In the embodiments described above, part of the configuration implemented in hardware may be replaced with software and, conversely, all or part of the configuration implemented in software may be replaced with hardware.

(11) When all or some of the functions of the present disclosure are implemented with computer programs, the programs may be stored on a computer-readable storage medium (a non-transitory computer readable storage medium, for example). The programs may be used on the same storage medium on which they were supplied or may be transferred to a different storage medium (a computer-readable storage medium). The "computer-readable storage medium" may be a portable storage medium, such as a memory card or a CD-ROM; an internal storage device built into the computer, such as any of various ROM or the like; or an external storage device, such as a hard disk drive, connected to the computer.

While the description has been made in detail with reference to specific embodiments and variations thereof, it would be apparent to those skilled in the art that various changes and modifications may be made thereto.

What is claimed is:
1. An information processing device comprising a controller configured to perform:

(a) acquiring a plurality of sets of first information from at least one printing device having a plurality of mounting portions and a plurality of printing portions in total, a plurality of first cartridges accommodating printing agent is currently mounted in respective ones of the plurality of mounting portions, the plurality of printing portions being configured to execute printing operations using printing agent supplied from respective ones of the plurality of first cartridges, the plurality of sets of first information corresponding to respective ones of the plurality of first cartridges, each of the plurality of sets of first information being representative of a residual quantity of printing agent remaining in a corresponding one of the plurality of first cartridges and a corresponding one of the printing portions;

(b) acquiring a plurality of sets of second information from the at least one printing device, the plurality of sets of second information corresponding to respective ones of a plurality of second cartridges, the plurality of second cartridges being previously mounted in respective ones of the plurality of mounting portions and having been replaced with respective ones of the plurality of first cartridges, each of the plurality of sets of second information being representative of a final residual quantity of printing agent remaining in a corresponding one of the plurality of second cartridges and a corresponding one of the plurality of printing portions when the corresponding one of the plurality of second cartridges is replaced;

(c) selecting a target first cartridge from among the plurality of first cartridges, the plurality of sets of first information including target first information corresponding to the target first cartridge;

(d) setting an order level for the target first cartridge using target second information among the plurality of sets of second information, the target second information corresponding to a target second cartridge among the plurality of second cartridges, the target second cartridge having been replaced with the target first cartridge, the order level being selected from among a plurality of levels including a first level and a second level, the first level being selected in a case where the target second information represents a final residual quantity greater than a reference, the second level being selected in a case where the target second information represents a final residual quantity less than or equal to the reference;

(e) determining whether an order condition is met for the target first cartridge using the target first information;

(f) setting, in response to determining that the order condition is met, at least one replacement target cartridge from among the plurality of first cartridges using the plurality of sets of first information and the order level, the at least one replacement target cartridge including the target first cartridge; and (g) executing an ordering process to order at least one replacement cartridge for replacement with respective ones of the at least one replacement target cartridge, wherein the at least one replacement target cartridge includes M number of first cartridges in a case where the order level is the first level, M being an integer greater than or equal to one, and wherein the at least one replacement target cartridge includes N number of first cartridges in a case where the order level is the second level, N being an integer greater than or equal to M.

2. The information processing device according to claim 1, wherein M is one.

3. The information processing device according to claim 1, wherein the (f) setting sets the at least one replacement target cartridge using a plurality of index values based on respective ones of the plurality of sets of first information.

4. The information processing device according to claim 3, wherein the (f) setting sets, as the at least one replacement target cartridge, a first cartridge having an index value less than or equal to a first threshold in the case where the order level is the first level, the first threshold being associated with a first residual quantity of printing agent, and wherein the (f) setting sets, as the at least one replacement target cartridge, a first cartridge having an index value less than or equal to a second threshold different from the first threshold in the case where the order level is the second level, the second threshold being associated with a second residual quantity of printing agent greater than the first residual quantity of printing agent.

5. The information processing device according to claim 3, wherein each of the plurality of index values includes a first index value and a second index value, wherein the (f) setting sets, as the at least one replacement target cartridge, a first cartridge having a first index value less than or equal to a first threshold in the case where the order level is the first level, and wherein the (f) setting sets, as the at least one replacement target cartridge, a first cartridge having a first index value less than or equal to the first threshold and a first cartridge having a second index value less than or equal to a second threshold in the case where the order level is the second level.

6. The information processing device according to claim 3, wherein the (f) setting comprises:

(f1) calculating the plurality of index values based on the respective ones of the plurality of sets of first information, each of the plurality of index values including a component value indicating a time at which the residual quantity of printing agent represented by a corresponding one of the plurality of sets of first information becomes a prescribed quantity; and (f2) setting the at least one replacement target cartridge using the plurality of index values calculated in the (f1) calculating.

7. The information processing device according to claim 3, wherein the (f) setting comprises:

(f3) calculating the plurality of index values based on the respective ones of the plurality of sets of first information, each of the plurality of index values including a component value indicating the residual quantity of printing agent represented by a corresponding one of the plurality of sets of first information at a specific timing; and (f4) setting the at least one replacement target cartridge using the plurality of index values calculated in the (f3) calculating.

8. The information processing device according to claim 7, wherein the plurality of printing portions has respective ones of a plurality of tanks, the plurality of tanks being configured to accommodate printing agent supplied from respective ones of the plurality of first cartridges currently mounted in respective ones of the plurality of mounting portions, the plurality of printing portions being configured to execute printing operations using printing agent accommodated in respective ones of the plurality of tanks, wherein the (f4) setting sets, as the at least one replacement target cartridge, a first cartridge having an index value including a component value less than or equal to a first reference in the case where the order level is the first level, and wherein the first reference represents a boundary quantity of printing agent in the first cartridge and a tank corresponding to the first cartridge among the plurality of tanks, the boundary quantity being a residual quantity of printing agent in the first cartridge and the tank at a time of transition from a first state to a second state, the first state being a state in which the first cartridge and the tank accommodate printing agent, the second state being a state in which the first cartridge is out of printing agent while the tank accommodates printing agent.

9. The information processing device according to claim 8, wherein the (f4) setting sets, as the at least one replacement target cartridge, a first cartridge having an index value including a component value less than or equal to a second reference in the case where the order level is the second level, and wherein the second reference represents a prescribed residual quantity of printing agent remaining in the first cartridge and the tank in the first state.

10. The information processing device according to claim 1, wherein each of the plurality of printing portions has no tank for accommodating printing agent supplied from corresponding one of the plurality of first cartridge, and each of the plurality of sets of first information being representative of a residual quantity of printing agent remaining in a corresponding one of the plurality of first cartridges.

11. A non-transitory computer readable storage medium storing a set of program instructions installed on and executed by a computer, the set of program instructions comprising:

(a) acquiring a plurality of sets of first information from at least one printing device having a plurality of mounting portions and a plurality of printing portions in total, a plurality of first cartridges accommodating printing agent is currently mounted in respective ones of the plurality of mounting portions, the plurality of printing portions being configured to execute printing operations using printing agent supplied from respective ones of the plurality of first cartridges, the plurality of sets of first information corresponding to respective ones of the plurality of first cartridges, each of the plurality of sets of first information being representative of a residual quantity of printing agent remaining in a corresponding one of the plurality of first cartridges and a corresponding one of the plurality of printing portions;

(b) acquiring a plurality of sets of second information from the at least one printing device, the plurality of sets of second information corresponding to respective ones of a plurality of second cartridges, the plurality of second cartridges being previously mounted in respective ones of the plurality of mounting portions and having been replaced with respective ones of the plurality of first cartridges, each of the plurality of sets of second information being representative of a final residual quantity of printing agent remaining in a corresponding one of the plurality of second cartridges and a corresponding one of the plurality of printing portions when the corresponding one of the plurality of second cartridges is replaced;

(c) selecting a target first cartridge from among the plurality of first cartridges, the plurality of sets of first information including target first information corresponding to the target first cartridge;

(d) setting an order level for the target first cartridge using target second information among the plurality of sets of second information, the target second information corresponding to a target second cartridge among the plurality of second cartridges, the target second cartridge having been replaced with the target first cartridge, the order level being selected from among a plurality of levels including a first level and a second level, the first level being selected in a case where the target second information represents a final residual quantity greater than a reference, the second level being selected in a case where the target second information represents a final residual quantity less than or equal to the reference;

(e) determining whether an order condition is met for the target first cartridge using the target first information;

(f) setting, in response to determining that the order condition is met, at least one replacement target cartridge from among the plurality of first cartridges using the plurality of sets of first information and the order level, the at least one replacement target cartridge including the target first cartridge; and (g) executing an ordering process to order at least one replacement cartridge for replacement with respective ones of the at least one replacement target cartridge, wherein the at least one replacement target cartridge includes M number of first cartridges in a case where the order level is the first level, M being an integer greater than or equal to one, and wherein the at least one replacement target cartridge includes N number of first cartridges in a case where the order level is the second level, N being an integer greater than or equal to M.

12. The non-transitory computer readable storage medium according to claim 11, wherein M is one.

13. The non-transitory computer readable storage medium according to claim 11, wherein the (f) setting sets the at least one replacement target cartridge using a plurality of index values based on respective ones of the plurality of sets of first information.

14. The non-transitory computer readable storage medium according to claim 13, wherein the (f) setting sets, as the at least one replacement target cartridge, a first cartridge having an index value less than or equal to a first threshold in the case where the order level is the first level, the first threshold being associated with a first residual quantity of printing agent, and wherein the (f) setting sets, as the at least one replacement target cartridge, a first cartridge having an index value less than or equal to a second threshold different from the first threshold in the case where the order level is the second level, the second threshold being associated with a second residual quantity of printing agent greater than the first residual quantity of printing agent.

15. The non-transitory computer readable storage medium according to claim 13, wherein each of the plurality of index values includes a first index value and a second index value, wherein the (f) setting sets, as the at least one replacement target cartridge, a first cartridge having a first index value less than or equal to a first threshold in the case where the order level is the first level, and wherein the (f) setting sets, as the at least one replacement target cartridge, a first cartridge having a first index value less than or equal to the first threshold and a first cartridge having a second index value less than or equal to a second threshold in the case where the order level is the second level.

16. A method executed by a computer comprising:
(a) acquiring a plurality of sets of first information from at least one printing device having a plurality of mounting portions and a plurality of printing portions in total, a plurality of first cartridges accommodating printing agent is currently mounted in respective ones of the plurality of mounting portions, the plurality of printing portions being configured to execute printing operations using printing agent supplied from respective ones of the plurality of first cartridges, the plurality of sets of first information corresponding to respective ones of the plurality of first cartridges, each of the plurality of sets of first information being representative of a residual quantity of printing agent remaining in a corresponding one of the plurality of first cartridges and a corresponding one of the printing portions;
(b) acquiring a plurality of sets of second information from the at least one printing device, the plurality of sets of second information corresponding to respective ones of a plurality of second cartridges, the plurality of second cartridges being previously mounted in respective ones of the plurality of mounting portions and having been replaced with respective ones of the plurality of first cartridges, each of the plurality of sets of second information being representative of a final residual quantity of printing agent remaining in a corresponding one of the plurality of second cartridges and a corresponding one of the plurality of printing portions when the corresponding one of the plurality of second cartridges is replaced;
(c) selecting a target first cartridge from among the plurality of first cartridges, the plurality of sets of first information including target first information corresponding to the target first cartridge;
(d) setting an order level for the target first cartridge using target second information among the plurality of sets of second information, the target second information corresponding to a target second cartridge among the plurality of second cartridges, the target second cartridge having been replaced with the target first cartridge, the order level being selected from among a plurality of levels including a first level and a second level, the first level being selected in a case where the target second information represents a final residual quantity greater than a reference, the second level being selected in a case where the target second information represents a final residual quantity less than or equal to the reference;
(e) determining whether an order condition is met for the target first cartridge using the target first information;
(f) setting, in response to determining that the order condition is met, at least one replacement target cartridge from among the plurality of first cartridges using the plurality of sets of first information and the order level, the at least one replacement target cartridge including the target first cartridge; and
(g) executing an ordering process to order at least one replacement cartridge for replacement with respective ones of the at least one replacement target cartridge,
wherein the at least one replacement target cartridge includes M number of first cartridges in a case where the order level is the first level, M being an integer greater than or equal to one, and
wherein the at least one replacement target cartridge includes N number of first cartridges in a case where the order level is the second level, N being an integer greater than or equal to M.

17. The method according to claim 16, wherein M is one.

18. The method according to claim 16, wherein the (f) setting sets the at least one replacement target cartridge using a plurality of index values based on respective ones of the plurality of sets of first information.

19. The method according to claim 18, wherein the (f) setting sets, as the at least one replacement target cartridge, a first cartridge having an index value less than or equal to a first threshold in the case where the order level is the first level, the first threshold being associated with a first residual quantity of printing agent, and
wherein the (f) setting sets, as the at least one replacement target cartridge, a first cartridge having an index value less than or equal to a second threshold different from the first threshold in the case where the order level is the second level, the second threshold being associated with a second residual quantity of printing agent greater than the first residual quantity of printing agent.

20. The method according to claim 18, wherein each of the plurality of index values includes a first index value and a second index value,
wherein the (f) setting sets, as the at least one replacement target cartridge, a first cartridge having a first index value less than or equal to a first threshold in the case where the order level is the first level, and
wherein the (f) setting sets, as the at least one replacement target cartridge, a first cartridge having a first index value less than or equal to the first threshold and a first cartridge having a second index value less than or equal to a second threshold in the case where the order level is the second level.

* * * * *